US 8,081,865 B2

(12) United States Patent
Ito

(10) Patent No.: US 8,081,865 B2
(45) Date of Patent: Dec. 20, 2011

(54) AV DATA RECORDING APPARATUS AND METHOD, RECORDING MEDIA RECORDED BY THE SAME, AV DATA REPRODUCING APPARATUS AND METHOD, AND AV DATA RECORDING AND REPRODUCING APPARATUS AND METHOD

(75) Inventor: Masanori Ito, Moriguchi (JP)

(73) Assignee: Panasonic Corporation, Osaka (JP)

( * ) Notice: Subject to any disclaimer, the term of this patent is extended or adjusted under 35 U.S.C. 154(b) by 3006 days.

(21) Appl. No.: 10/109,575

(22) Filed: Mar. 27, 2002

(65) Prior Publication Data

US 2002/0168174 A1 Nov. 14, 2002

(30) Foreign Application Priority Data

Mar. 29, 2001 (JP) ................................. 2001-096558
May 30, 2001 (JP) ................................. 2001-161929

(51) Int. Cl.
| | |
|---|---|
| *H04N 9/80* | (2006.01) |
| *H04N 5/04* | (2006.01) |
| *H04N 5/78* | (2006.01) |
| *H04N 5/89* | (2006.01) |
| *H04N 5/92* | (2006.01) |
| *H04N 5/783* | (2006.01) |
| *H04N 5/917* | (2006.01) |
| *H04N 7/00* | (2011.01) |
| *H04N 7/12* | (2006.01) |
| *H04N 7/16* | (2011.01) |
| *H04J 3/06* | (2006.01) |
| *H04J 3/22* | (2006.01) |
| *H04L 12/56* | (2006.01) |
| *G11B 5/09* | (2006.01) |

(52) U.S. Cl. ........ 386/248; 386/241; 386/247; 386/252; 386/324; 386/334; 386/337; 386/338; 386/343; 386/350; 386/355; 386/356; 348/423.1; 348/474; 348/500; 360/32; 370/394; 370/503; 370/510; 370/537; 725/139; 725/142; 725/151; 725/153

(58) Field of Classification Search ................... 386/27, 386/33, 45, 46, 65, 68, 69, 70, 95, 96, 109, 386/124, 125, 126, 104, 105, 112, E9.013, 386/51, 241, 248, 252, 337, 343, 350, 355, 386/356, E5.014; 348/423.1, 474, 500, E5.007; 370/394, 510, 503, 537, 395.62, 421, 474, 370/509, 519, 535; 725/139, 142, 151, 153; 375/E7.267, E7.271, E7.279, E7.022, E7.023, 375/E7.278, E7.025, E7.273, E7.004, E7.024; 365/53.34; 360/32; G9B/27.012

See application file for complete search history.

(56) References Cited

U.S. PATENT DOCUMENTS 5,455,684 A * 10/1995 Fujinami et al. ............... 386/356
(Continued)

FOREIGN PATENT DOCUMENTS

JP 62277682 A * 12/1987
(Continued)

*Primary Examiner* — Thai Tran
*Assistant Examiner* — Syed Hasan
(74) *Attorney, Agent, or Firm* — Hamre, Schumann, Mueller & Larson, P.C.

(57) ABSTRACT

To provide an AV data recording and reproducing apparatus capable of easily carrying out real-time recording and reproducing via a 1394 interface, and method thereof. Input time information relating to one or a plurality of transport packets are stored in the different transport packet; the transport packets and the different transport packet having input time information relating to the transport packets are recorded; and at the same time the transport packet recorded in the recording medium and the different transport packet are read; the different transport packet corresponding to one of a plurality of the recorded transport packets are extracted and the input time is specified; and based on the input time information, the corresponding transport packet is output.

45 Claims, 17 Drawing Sheets

U.S. PATENT DOCUMENTS

| | | | |
|---|---|---|---|
| 5,621,840 A * | 4/1997 | Kawamura et al. | 386/343 |
| 6,115,537 A * | 9/2000 | Yamada et al. | 386/109 |
| 6,169,843 B1 * | 1/2001 | Lenihan et al. | 386/46 |
| 6,353,702 B1 * | 3/2002 | Ando et al. | 386/95 |
| 6,363,212 B1 * | 3/2002 | Fujinami et al. | 386/104 |
| 6,414,970 B1 * | 7/2002 | Negishi et al. | 370/510 |
| 6,549,721 B1 * | 4/2003 | Ando et al. | 386/95 |
| 6,618,549 B1 * | 9/2003 | Kato et al. | 386/94 |
| 6,778,537 B1 * | 8/2004 | Ishibashi | 370/395.62 |
| 6,879,768 B1 * | 4/2005 | Ono et al. | 386/46 |
| 6,925,247 B2 * | 8/2005 | Kim et al. | 386/68 |
| 7,031,418 B2 * | 4/2006 | Yoo et al. | 375/354 |
| 7,076,153 B2 * | 7/2006 | Ando et al. | 386/95 |
| 7,095,948 B2 * | 8/2006 | Teunissen | 386/68 |
| 7,123,306 B1 * | 10/2006 | Goto et al. | 348/474 |
| 7,133,407 B2 * | 11/2006 | Jinzaki et al. | 370/395.64 |
| 7,162,642 B2 * | 1/2007 | Schumann et al. | 713/189 |
| 7,177,521 B2 * | 2/2007 | Ando et al. | 386/68 |
| 2001/0046227 A1 * | 11/2001 | Matsuhira et al. | 370/355 |
| 2006/0120696 A1 * | 6/2006 | Ando et al. | 386/95 |
| 2007/0122112 A1 * | 5/2007 | Ando et al. | 386/95 |

FOREIGN PATENT DOCUMENTS

| | | |
|---|---|---|
| JP | 2001-268518 | 9/2001 |
| JP | 2002-118824 | 4/2002 |

* cited by examiner

AV DATA RECORDING APPARATUS AND METHOD, RECORDING MEDIA RECORDED BY THE SAME, AV DATA REPRODUCING APPARATUS AND METHOD, AND AV DATA RECORDING AND REPRODUCING APPARATUS AND METHOD

FIELD OF THE INVENTION

The present invention relates to an AV data recording and reproducing apparatus and a method for real-time recording and reproducing video data and audio data via a digital interface by using a recording medium such as an optical disk.

DESCRIPTION OF RELATED ART

An example of a method for compressing video data at a low bit rate includes a system stream defined by the Moving Picture Experts Group (MPEG) 2 standard (ISO/IEC 13818-1). In the system stream, three kinds of streams, i.e., a program stream (PS), a transport stream (TS) and a Packetized Elementary Stream (PES) are defined.

On the other hand, as video-data recording media instead of a magnetic tape, much attention has been paid to optical disks of DVD-RAM, MO, and the like. FIG. 4 is a diagram showing a configuration of a conventional apparatus for real-time recording and reproducing video data by using a DVD-RAM disk. Herein, the case where video signals are recorded and reproduced via a 1394 interface will be explained.

In FIG. 4, a transport stream including video signals input from a 1394 I/F (interface) part 1 is converted into a program stream in a TS/PS converting part and written in a DVD-RAM disk 30 via a recording part 5 and a pick up 12.

At the time of reproduction, the program stream read via the pick up 12 and a reproducing part 6 is PS/TS converted into the transport stream and simultaneously is output to external equipment via an output timing adjusting part 21.

At the time of recording, a recording controlling part 8 controls the recording part 5. Furthermore, a contiguous data area detection part 7 examines a use state of sectors managed by a logic block managing part 10 and detects physically continuous empty area.

When deleting a recorded video signal file, a recording control part 8 controls the recording part 5 and the reproducing part 6 and executes the deleting process.

Furthermore, FIG. 5 shows a recording format in the case where video data are recorded in a DVD-RAM in real time. The DVD-RAM includes 2-Kbyte sectors, and 16 of the 2-Kbyte sectors constitute one logic block. Every logic block is provided with an error correction sign and recorded in the DVD-RAM. Furthermore, physically consecutive logic blocks corresponding to 11 seconds or more on the maximum recording rate basis are secured as one contiguous data area, and into this area, unit video packets (Video Object UNIT: hereinafter referred to as "VOBU") each including the MPEG stream corresponding to 0.4 to 1 second are recorded sequentially. One VOBU includes packs, that is, the lower hierarchy of the 2-Kbyte MPEG program stream. The pack includes two kinds of packs, that is, a video pack (V_PCK) in which video compressed data are stored and an audio pack (A_PCK) in which audio compressed data are stored. In addition, one VOBU includes all V_PCKs of the corresponding time. Furthermore, one VOBU includes all A_PCKs including audio frame required in timing. That is, in the VOBU, an audio frame and a video frame are completed.

The contiguous data area detection part 7 of the AV data recording and reproducing apparatus re-detects the following contiguous data areas when the remainder of one contiguous data area becomes areas equivalent to less than 3 seconds with the conversion in the maximum recording rate conversion. Then, when one contiguous data area is full, data are written in the following contiguous data area.

Furthermore, FIG. 6 shows a state in which the recording content on DVD-RAM is managed by a UDF (Universal Disk Format) file system or an ISO/IEC 13346 (Volume and file structure of write-once and rewritable media using non-sequential recording for information interchange) file system. In FIG. 6, one consecutively recorded MPEG program stream is recorded as a file VR_MOVIE.VRO. With respect to this file, the file name and file entry position are managed by FID (File Identifier Descriptor). The file name is set as VR_MOVIE.VRO in a file identifier column and the file entry position is set as a head sector number of the file entry in an ICB column.

Note here that the UDF standard corresponds to a package protocol of the ISO/IEC 13346 standard. Furthermore, by connecting a DVD-RAM drive to a personal computer via the 1394 interface and SBP-2 protocol (Serial Bus Protocol-2), a file written in a form conforming to the UDF standard can be treated as a file also from the personal computer.

Furthermore, the file entry manages the contiguous data areas a, b, and c in which data are stored by using an allocation data descriptor. Specifically, when a recording control part 8 finds a defective logic block during recording data into the contiguous data area a, it skips the logic block and continues to write data from the head of the contiguous data area b. Next, when the recording controlling part 8 detects that it meets a recording area of the PC file during recording of data into the contiguous data area b, it continues to write from the head of the contiguous data area c. As a result, the file VR_MOVIE.VRO includes the contiguous data areas a, b and c.

FIG. 7 is a view showing a configuration of the allocation descriptor. FIG. 7A shows a short allocation descriptor and FIG. 7B shows a format of an extended allocation descriptor. An extent length indicates the data size represented in bytes and an extent position indicates the number of a starting sector of data. The recording length indicates the data size of actually recorded data expressed in bytes. An information length indicates the data size represented in bytes before compression in a case where data are compressed. A usable area indicates an area that can be used freely.

Furthermore, the starting position of data as a representation rule of the allocation descriptor, which the allocation descriptors a, b and c shown in FIG. 6 refer to, corresponds to the heads of sectors. Furthermore, the extent length of data, which the allocation descriptors a and b except for the rearmost allocation descriptor c refer to, is required to be an integral multiple of one sector. By using the recording length of the extended allocation descriptor, the effective data length is not necessarily limited to an integral multiple of one sector and the effective data with not more than the extent length can be arranged.

Note here that the extended allocation descriptor is allowed to be used in the UDF standard but is not allowed to be used in the subset standard of UDF (UDF-Bridge) employed by DVD-ROM. Furthermore, the kind of the allocation descriptor is described in the file entry.

Furthermore, the data size of one VOBU changes in the range of the maximum recording rate or less when video data have a variable bit rate. When the video data have a fixed bit rate, the size of the VOBU is substantially constant.

Furthermore, at the time of reproducing the recorded content, reading data from a phase-change optical disk such as a DVD-RAM disk and outputting the read data are carried out simultaneously. At this time, the speed of outputting data is set to be higher than the speed of reading data while controlling so that data to be reproduced are not lost. Therefore, when consecutive reading data and consecutive outputting of data are continued, it is possible to secure data to be output as an extra by the difference of the speeds. By using such data, which can be secured as an extra, as output data while reading data is ceased by a jump of the pick-up, consecutive reproduction can be realized.

Specifically, when the speed of reading data is 11 Mbps, the speed of outputting data is 8 Mbps at the maximum and the maximum moving time is 3 seconds, 24 Mbits of extra data are needed for an extra output data. In order to secure such an extra data, it is necessary to read data consecutively for 8 seconds. That is, it is necessary to carry out the consecutive reading for a time calculated by dividing 24 Mbits by the difference between the speed for reading data (11 Mbps) and the speed for outputting data (8 Mbps).

Therefore, during the consecutive reading for 8 seconds, 88 Mbits, that is, 11 seconds of output data are read. Thus, by securing 11 seconds or more of contiguous data area, the consecutive data reproduction can be secured.

Note here that this contiguous data area may include several defective logic blocks in the middle thereof. In this case, however, by taking the reading time necessary to read such defective logic blocks during reproduction into account, it is necessary to secure little more than 11 seconds of contiguous data areas.

AV apparatuses in the future tend to be equipped with an IEEE 1394 digital interface as a standard equipment. However, the video data synchronous communication on the IEEE 1394 interface is standardized only with respect to the MPEG transport stream.

Therefore, in a conventional AV data recording apparatus and AV data recording and reproducing apparatus, when video data are transmitted to D-VHS or set top box (STB) and recorded via the IEEE 1394 digital interface, it is necessary to convert a MPEG program stream into a PES stream and then to convert into a MPEG transport stream. Thus, a complicated converting system was needed. The same is true in the case that recorded video data are reproduced.

Furthermore, due to complicated converting systems being involved, it was technically difficult to allow the transport stream input into the recording apparatus to correspond completely to the transport stream output from the recording apparatus when transport stream with variously different detailed portions are recorded in the form of the program stream and then the recorded contents are output into another equipment in the form of the transport stream.

One example of the methods to solve these problems is a method of adding 4 bytes of time stamps in the unit of the transport packets. However, in this method, there is a problem in that the length of the packet becomes 192 bytes and does not conform to the transport stream of the MPEG2 system standard.

Another example of the methods is a method of recording the transport packet as it is. However, in this method, it is necessary to calculate the output timing at the time of outputting to the outside based on the packet size at the receiving side. Therefore, there is a problem in that the transport packet has to know the information relating to the buffer size at the expected receiving side in advance.

SUMMARY OF THE INVENTION

With the foregoing in mind, it is an object of the present invention to provide a video data recording apparatus or a video data recording and reproducing apparatus capable of easily real-time recording and real-time reproducing video data with respect to a D-VHS or a set top box (STB) via an IEEE 1394 digital interface and a method thereof.

Furthermore, it also is an object of the present invention easily to realize a recording format in which recorded contents on a recording medium easily can be seen as a data file conforming to the MPEG standard when a personal computer is connected.

Furthermore, it also is an object of the present invention to record an input transport stream in a form in which it easily can be sent out in the case that the transport stream is sent out in the middle of the transport stream to the outside.

As mentioned above, the present invention can provide a recording method capable of easily both securing a real-time reproduction including a reproduction from the middle by using a synchronous transfer means for video data or audio data via the digital interface and securing a reproduction of a file by using an asynchronous transfer means when a personal computer is connected (file becomes reproducible when the file conforms to the MPEG standard).

In order to achieve the above-mentioned object, the AV data recording apparatus of the present invention includes a packet input part for inputting a packet having a predetermined data structure, an information generation part for storing information relating to one or a plurality of the packets including at least information relating to an input time of the input packet in a different packet having the same data structure, and a recording part for recording one or a plurality of the packets and the different packet having information relating to the packets, wherein the recording part records both one or a plurality of the packets and the different packet having information relating to the packets.

Furthermore, in order to achieve the above-mentioned object, the AV data recording apparatus of the present invention includes a packet input part for inputting a packet having a predetermined data structure, a time information generation part for storing input time information relating to one or a plurality of the input packets in a different packet having the same data structure, and a recording part for recording one or a plurality of the packets and the different packet having the input time information relating to the packets, wherein the recording part records both one or a plurality of the packets and the different packet having the input time information relating to the packets.

According to such configurations, a real-time recording/real-time reproduction of packets including video data via the 1394 interface easily can be realized because no specific converting processes are necessary. Furthermore, by completely repeating the transmission timing of the packets at the time of reproduction, consecutive reproduction can be secured.

Furthermore, in order to achieve the above-mentioned object, the AV data recording apparatus of the present invention includes a transport packet input part, a time information generation part for storing input time information relating to one or a plurality of the input transport packets in a different transport packet, and a recording part for recording one or a plurality of the transport packets and the different transport packet having the input time information relating to the transport packets, wherein the recording part records both one or a plurality of the transport packets and the different transport packet having the input time information.

According to such a configuration, a real-time recording/real-time reproduction of transport streams including video data via the 1394 interface easily can be realized because no specific stream converting processes are necessary. Furthermore, by completely repeating the transmission timing of the transport packets at the time of reproduction, consecutive reproduction can be secured. Furthermore, when a personal computer is connected, the recorded file can be seen as a stream that conforms to the MPEG standard.

Furthermore, in the AV data recording apparatus of the present invention, it is preferable that in the time information generation part, a predetermined number of pieces of the input time information are stored as a whole in the other transport packet, and in the recording part, just behind or just before the different transport packet having the input time information relating to a predetermined number of the transport packets, one or a plurality of the corresponding transport packets are recorded. It is advantageous because a seek operation in referring to the time information can be reduced to the minimum. Also, it is advantageous because the recording position of the transport packet storing time information can be simplified.

Furthermore, in the AV data recording apparatus, it is preferable that in the recording part, just behind or just before the different transport packet having the input time information relating to the individual transport packets, the corresponding transport packet is recorded. It is advantageous because individual transport packets can be reproduced the most effectively. Also, it is advantageous because the recording position of the transport packet storing time information can be simplified.

Furthermore, in the AV data recording apparatus, it is preferable that in the time information generation part, when the input time information relating to a plurality of transport packets is stored in the different transport packet, the input time information is stored with compression. It is advantageous because it is possible to secure many recording areas of AV data themselves, thus improving the efficiency of recording the transport packets themselves.

Furthermore, in the AV data recording apparatus, it is preferable that in the time information generation part, when the input time information relating to a plurality of transport packets is stored in the different transport packet, the input time information is stored as variable length data. It is advantageous because it is possible to reduce the area in which AV data cannot be recorded in the recording area of the transport packet to a necessary minimum since the input time information is variable length data, thus improving the efficiency of recording the transport packets themselves.

Furthermore, in the AV data recording apparatus, it is preferable that in the time information generation part, when the input time information relating to a plurality of transport packets is stored in the different transport packet, and when the input time information is equal consecutively, the number of the input time information which is equal consecutively is stored as the input time information. It is advantageous because it is possible to reduce the area in which AV data cannot be recorded in the recording area of the transport packets, thus improving the efficiency of recording the transport packets themselves.

Furthermore, in the AV data recording apparatus, it is preferable that in the time information generation part, when the input time information relating to a plurality of transport packets is stored in the different transport packet, the difference value between the two input times is stored as the input time information. It is advantageous because it is possible to reduce the area in which AV data cannot be recorded in the recording area of the transport packets, thus improving the efficiency of recording the transport packets themselves.

Furthermore, in the AV data recording apparatus, it is preferable that in the time information generation part, when the input time information relating to a plurality of transport packets is stored in the different transport packet, a value obtained by subtracting a predetermined value from the difference value of the two input times is stored as the input time information. It is advantageous because it is possible to reduce the area in which AV data cannot be recorded in the recording area of the transport packets, thus improving the efficiency of recording the transport packets themselves.

Furthermore, in the AV data recording apparatus, it is preferable that in the time information generation part, when the input time information relating to a plurality of transport packets is stored in the different transport packet, a value obtained by subtracting a predetermined value from the difference value of the two input times is stored as the input time information, and the obtained value is stored in the transport packet together with the predetermined value. It is advantageous because it is possible to reduce the area in which AV data cannot be recorded in the recording area of the transport packets, thus improving the efficiency of recording the transport packets themselves.

Furthermore, in the AV data recording apparatus of the present invention, it is preferable that in the time information generation part, the predetermined value is an average value of the difference values in the different transport packet generated in the past.

Furthermore, in the AV data recording apparatus of the present invention, it is preferable that in the time information generation part, the predetermined value is a value corresponding to a bit rate of a transport packet to be input.

Furthermore, in the AV data recording apparatus of the present invention, it is preferable that in the time information generation part, the input time information with respect to a transport packet including the head portion of a decoding unit of a specific elementary stream is stored as the input time information located substantially at the head position in the different transport packet. Regardless of which decoding unit in the stream data such as video data the reproduction is started from, the input time information is present, for example, just in front and thus a searching process for the input time information itself becomes unnecessary, and therefore the real time reproduction can be carried out efficiently.

Furthermore, in the AV data recording apparatus of the present invention, it is preferable that in the time information generation part, the input time information with respect to a transport packet including the head portion of a decoding unit of video data is stored as the input time information located substantially at the head position in the different transport packet. Regardless of which decoding unit in the video data the reproduction is started from, the input time information is present, for example, just in front and thus a searching process for the input time information itself becomes unnecessary, and therefore the real time reproduction can be carried out efficiently.

Furthermore, in the AV data recording apparatus of the present invention, it is preferable that in the time information generation part, the input time information with respect to a transport packet including the head portion of a sequence header of video data is stored as the input time information located substantially at the head position in the different transport packet. Regardless of which sequence header in the video data the reproduction is started from, the input time information is present, for example, just in front and thus a searching process for the input time information itself becomes unnecessary, and therefore the real time reproduction can be carried out efficiently.

Furthermore, in the AV data recording apparatus of the present invention, it is preferable that in the time information generation part, the input time information with respect to a transport packet further including a program association table is stored as the input time information located substantially at the head position in the different transport packet. Regardless of which program association table in the video data the reproduction is started from, the input time information is present, for example, just in front and thus a searching process for the input time information itself becomes unnecessary, and therefore the real time reproduction can be carried out efficiently.

Furthermore, in the AV data recording apparatus of the present invention, it is preferable that in the time information generation part, the input time information with respect to a transport packet further including a GOP header of video data is stored as the input time information located substantially at the head position in the different transport packet. Regardless of which GOP header in the video data the reproduction is started from, the input time information is present, for example, just in front and thus a searching process for the input time information itself becomes unnecessary, and therefore the real time reproduction can be carried out efficiently.

Furthermore, in the AV data recording apparatus of the present invention, it is preferable that in the time information generation part, the input time information with respect to a transport packet including the head portion of a decoding unit of audio data is stored as the input time information located substantially at the head position in the different transport packet. Regardless of which audio frame in the audio stream the reproduction is started from, the input time information is present, for example, just in front and thus a searching process for the input time information itself becomes unnecessary, and therefore the real time reproduction can be carried out efficiently.

Furthermore, in the AV data recording apparatus of the present invention, it is preferable that in the time information generation part, the input time information with respect to a transport packet including the head portion of a decoding unit of a data broadcast stream is stored as the input time information located substantially at the head position in the different transport packet. Regardless of which data decoding unit in the video data the reproduction is started from, the input time information is present, for example, just in front and thus a searching process for the input time information itself becomes unnecessary, and therefore the real time reproduction can be carried out efficiently.

Furthermore, in the AV data recording apparatus of the present invention, it is preferable that in the transport packet input part, the different transport packet having the input time information is removed. It is advantageous because it is possible to prevent the input time information from being recorded overlappedly.

Furthermore, in the AV data recording apparatus of the present invention, it is preferable that in the time information generation part, the input time information is stored in a payload area of a null packet. It is advantageous because the position in which the input time information is stored becomes clarified in the standard.

Furthermore, in the AV data recording apparatus of the present invention, it is preferable that in the time information generation part, the number of transport packets in which the input time information is not stored is stored in the different transport packet. It is advantageous because it is possible to skip a transport packet in which input time information is not stored, and thus to prevent unnatural reproductions in connecting portions of the AV data.

Next, in order to achieve the above-mentioned object, the AV data recording apparatus of the present invention includes a transport packet generation part, a time information generation part for storing input time information relating to one or a plurality of the transport packets input from the transport packet generation part in a different transport packet, and a recording part for recording one or a plurality of the transport packets and the different transport packet having the input time information relating to the transport packets, wherein the recording part records both one or a plurality of the transport packets and the different transport packet having the input time information; the time information generation part stores a value obtained by subtracting a predetermined value from the difference value between the two input times of the transport packets as the input time information; and the transport packet generation part generates the transport packets substantially at the same intervals.

According to such a configuration, when a real-time reproduction of transport streams including video data is carried out via the 1394 interface, since no specific stream converting processes are required, not only consecutive reproduction can be secured but also the data amount of the input time information itself can be compressed to about ⅕. Therefore, it is possible to reduce the area in which AV data cannot be recorded, thus improving the recording efficiency of the AV data.

Next, in order to achieve the above-mentioned object, the AV data reproducing apparatus of the present invention includes a reading part for reading a packet having a predetermined data structure recorded in a recording medium, a time information extracting part for extracting one different packet in which a predetermined number of pieces of information relating to one or a plurality of packets including at least information relating to an input time of the packet recorded in the recording medium are recorded as a whole, and specifying the input time of the packet, and an output part for outputting the packets, wherein in the output part, the corresponding packet is output based on the information relating to the packets.

Furthermore, in order to achieve the above-mentioned object, the AV data reproducing apparatus of the present invention includes a reading part for reading a packet having a predetermined data structure recorded in a recording medium, a time information extracting part for extracting one different packet in which a predetermined number of pieces of input time information relating to one or a plurality of the packets recorded in the recording medium are recorded as a whole, and specifying the input time of the packets, and an output part for outputting the packets, wherein in the output part, the corresponding packet is output based on the input time information relating to the packets.

According to such a configuration, when a real-time reproduction of packets including video data, etc. is carried out via the 1394 interface, no specific converting processes are required and thus consecutive reproduction can be secured by completely repeating the original transmission timing of the packets.

Furthermore, in order to achieve the above-mentioned object, the AV data reproducing apparatus of the present invention includes a reading part for reading a transport packet recorded in a recording medium, a time information extracting part for extracting one different transport packet in which a predetermined number of pieces of input time information relating to one or a plurality of the transport packets recorded in the recording medium are recorded as a whole, and specifying the input time of the transport packet, and an output part for outputting the transport packets, wherein in the output part, the corresponding transport packet is output based on the input time information of the transport packets.

According to such a configuration, when a real-time reproduction of transport packets including video data is carried out via the 1394 interface, no specific stream converting processes are required and thus consecutive reproduction can be secured by completely repeating the original transmission timing of the packets.

Furthermore, in the AV data reproducing apparatus of the present invention, it is preferable that in the output part, the transport packet located behind or before the different transport packet including the input time information is output based on the input time information. It is advantageous because a seek operation can be minimized.

Furthermore, in the AV data reproducing apparatus of the present invention, it is preferable that in the output part, the different transport packet in which the input time information is recorded is output together.

Furthermore, in the AV data reproducing apparatus of the present invention, it is preferable that in the time information extracting part, the input time information relating to a plurality of transport packets stored with compression is extracted. It is advantageous because a real-time reproduction can be carried out more easily.

Furthermore, in the AV data reproducing apparatus of the present invention, it is preferable that in the time information extracting part, the input time information relating to a plurality of transport packets stored as variable length data is extracted. It is advantageous because it is possible to reduce the area in which AV data cannot be recorded in the recording area of the transport packet to a necessary minimum since the input time information is variable length data, thus enabling the real-time reproduction more easily.

Furthermore, in the AV data reproducing apparatus of the present invention, it is preferable that in the time information extracting part, when the input time information is equal consecutively, the number of the input time information which is equal consecutively is stored as the input time information is extracted. It is advantageous because the efficiency in recording the transport packets themselves is enhanced further, thus enabling the real-time reproduction more easily.

Furthermore, in the AV data reproducing apparatus of the present invention, it is preferable that in the time information extracting part, the difference value between the two input times stored as the input time information is extracted. It is advantageous because the efficiency in recording the transport packets themselves is enhanced further, thus enabling the real-time reproduction more easily.

Furthermore, in the AV data reproducing apparatus of the present invention, it is preferable that in the time information extracting part, a value obtained by subtracting a predetermined value from the difference value between the two input times stored as the input time information is extracted. It is advantageous because the efficiency in recording the transport packets themselves is enhanced further, thus enabling the real-time reproduction more easily.

Furthermore, in the AV data reproducing apparatus of the present invention, it is preferable that in the time information extracting part, a value obtained by subtracting a predetermined value from the difference value between the two input times stored as the input time information and the predetermined value stored in the transport packet are extracted. It is advantageous because the efficiency in recording the transport packets themselves is enhanced further, thus enabling the real-time reproduction more easily.

Furthermore, in the AV data reproducing apparatus of the present invention, it is preferable that in the time information extracting part, the predetermined value is an average value of the difference values in the different transport packets generated in the past.

Furthermore, in the AV data reproducing apparatus of the present invention, it is preferable that in the time information extracting part, the predetermined value is a value corresponding to a bit rate of a transport packet to be input.

Furthermore, in the AV data reproducing apparatus of the present invention, it is preferable that in the time information extracting part, the input time information with respect to a transport packet including the head portion of a decoding unit of a specific elementary stream stored as the input time information located substantially at the head position in the different transport packet is extracted. Regardless of which decoding unit in the stream data such as video data the reproduction is started from, the input time information is present just in front and thus a searching process for the input time information itself becomes unnecessary, and therefore the real time reproduction can be carried out efficiently.

Furthermore, in the AV data reproducing apparatus of the present invention, it is preferable that in the time information extracting part, the input time information with respect to a transport packet including the head portion of a decoding unit of video data stored as the input time information located substantially at the head position in the different transport packet is extracted. Regardless of which decoding unit in the video data the reproduction is started from, the input time information is present just in front and thus a searching process for the input time information itself becomes unnecessary, and therefore the real time reproduction can be carried out efficiently.

Furthermore, in the AV data reproducing apparatus of the present invention, it is preferable that in the time information extracting part, the input time information with respect to a transport packet including the head portion of a sequence header of a video data stored as the input time information located substantially at the head position in the different transport packet is extracted. Regardless of which sequence header in the video data the reproduction is started from, the input time information is present just in front and thus a searching process for the input time information itself becomes unnecessary, and therefore the real time reproduction can be carried out efficiently.

Furthermore, in the AV data reproducing apparatus of the present invention, it is preferable that in the time information extracting part, the input time information with respect to a transport packet including a program association table stored as the input time information located substantially at the head position in the different transport packet also is extracted. Regardless of which program association table in the video data the reproduction is started from, the input time information is present just in front and thus a searching process for the input time information itself becomes unnecessary, and therefore the real time reproduction can be carried out efficiently.

Furthermore, in the AV data reproducing apparatus of the present invention, it is preferable that in the time information extracting part, the input time information with respect to a transport packet including a GOP header of video data stored as the input time information located substantially at the head position in the different transport packet also is extracted. Regardless of which GOP header in the video data the reproduction is started from, the input time information is present just in front and thus a searching process for the input time information itself becomes unnecessary, and therefore the real time reproduction can be carried out efficiently.

Furthermore, in the AV data reproducing apparatus of the present invention, it is preferable that in the time information extracting part, the input time information with respect to a transport packet including the head portion of a decoding unit of audio data stored as the input time information located substantially at the head position in the different transport packet is extracted. Regardless of which audio frame in the audio stream the reproduction is started from, the input time information is present just in front and thus a searching process for the input time information itself becomes unnecessary, and therefore the real time reproduction can be carried out efficiently.

Furthermore, in the AV data reproducing apparatus of the present invention, it is preferable that in the time information extracting part, the input time information with respect to a transport packet including the head portion of a decoding unit of a data broadcast stream stored as the input time information located substantially at the head position in the different transport packet is extracted. Regardless of which data decoding unit in the video data the reproduction is started from, the input time information is present, for example, just in front and thus a searching process for the input time information itself becomes unnecessary, and therefore the real time reproduction can be carried out efficiently.

Next, in order to achieve the above-mentioned object, the AV data reproducing apparatus of the present invention includes a reading part for reading a transport packet recorded in a recording medium, a time information extracting part for extracting one different transport packet in which a predetermined number of pieces of input time information relating to one or a plurality of the transport packets recorded in the recording medium are recorded as whole, and an output part for outputting the transport packets, wherein in the output part, the outputting is carried out while ignoring the different transport packet extracted by the time information extracting part.

According to such a configuration, when a local reproduction of transport streams including video data is carried out, regardless of the input time information of the transport packets, the transport streams including video data that already have been recorded in recording media can be reproduced sequentially.

Next, in order to achieve the above-mentioned object, the AV data reproducing apparatus of the present invention includes a reading part for reading a transport packet recorded in a recording medium, a number extracting part for extracting one different transport packet recording the number of transport packets in which the input time information relating to one or a plurality of the transport packets recorded in the recording medium are not stored, and specifying the number of transport packets in which the input time information is not stored, and an output part for outputting the transport packets, wherein in the output part, the transport packets in which the input time information is not stored are not output based on the number.

According to such a configuration, when a real-time reproduction of transport streams including video data is carried out via the 1394 interface, it is possible to skip a transport packet in which input time information is not stored, and thus to prevent unnatural reproductions in joint portions of the AV data.

Next, in order to achieve the above-mentioned object, the AV data recording and reproducing apparatus of the present invention includes a packet input part for inputting a packet having a predetermined data structure, an information generation part for storing information relating to one or a plurality of the packets including at least information relating to an input time of the input packet in a different packet having the same data structure, a recording part for recording one or a plurality of the packets and the different packet having information relating to the packets, a reading part for reading the packet stored in a recording medium and the different packet, a time information extracting part for extracting the different packet corresponding to one or a plurality of the packets recorded in the recording medium, and specifying the input time of the packet, and an output part for outputting the packet, wherein in the recording part, both one or a plurality of the packets and the different packet having information relating to the packets are recorded, and in the output part, the corresponding packet is output based on the information relating to the packets.

Furthermore, in order to achieve the above-mentioned object, the AV data recording and reproducing apparatus of the present invention includes a packet input part for inputting a packet having a predetermined data structure, a time information generation part for storing input time information relating to one or a plurality of the input packets in a different packet having the same data structure, a recording part for recording one or a plurality of the packets and the different packet having input time information relating to the packets, a reading part for reading the packets having a predetermined data structure stored in a recording medium and the different packet, a time information extracting part for extracting the different packet corresponding to one or a plurality of the packets recorded in the recording medium, and specifying an input time of the packets, and an output part for outputting the packets, wherein in the recording part, one or a plurality of the packets and the different packet having input information relating to the packets are recorded, and in the output part, the corresponding packet is output based on the input time information relating to the packets.

According to such a configuration, a real-time recording/reproduction of transport streams including video data easily can be carried out via the 1394 interface because no specific packets converting processes are required. Furthermore, at the time of reproduction, by completely repeating the transferring timing of the packets, consecutive reproduction can be secured.

Next, in order to achieve the above-mentioned object, the AV data recording and reproducing apparatus of the present invention includes a transport packet input part, a time information generation part for storing input time information relating to one or a plurality of the input transport packets in a different transport packet, a recording part for recording one or a plurality of the transport packets and the different transport packet having the input time information relating to the transport packets, a reading part for reading the transport packets recorded in a recording medium and the different transport packet, a time information extracting part for extracting the different transport packet corresponding to one or a plurality of the recorded transport packets, and specifying the input time of the transport packet, and an output part for outputting the transport packets, wherein in the recording part, one or a plurality of the transport packets and the different transport packet having the input time information are recorded, and, in the output part, the corresponding transport packet is output based on the input time information of the transport packet.

According to such a configuration, a real-time recording/reproduction of transport streams including video data easily can be carried out via the 1394 interface, because no specific stream converting processes are required. Furthermore, at the time of reproduction, by completely repeating the transferring timing of the packets, consecutive reproduction can be secured. Furthermore, when a personal computer is connected, the recorded file can be seen as a stream that conforms to the MPEG standard.

Next, in order to achieve the above-mentioned object, the method for recording AV data of the present invention includes inputting a packet having a predetermined data structure, storing information relating to one or a plurality of the packets including at least information relating to an input time of the input packet in a different packet having the same data structure, and recording one or a plurality of the packets and the different packet having the information relating to the packets, wherein in recording, both one or a plurality of the recording packets and the different packet having information relating to the packets are recorded.

Furthermore, in order to achieve the above-mentioned object, the method for recording AV of the present invention includes inputting a packet having a predetermined data structure, storing input time information relating to one or a plurality of the input packets in a different packet having the same data structure, and recording one or a plurality of the packets and the different packet having the input time information relating to the packets, wherein in recording, both one or a plurality of the packets and the different packet having the input time information relating to the packets are recorded.

According to such a configuration, a real-time recording/reproduction of packets including video data easily can be carried out via the 1394 interface because no specific converting processes are required. Furthermore, at the time of reproduction, by completely repeating the transferring timing of the packets, consecutive reproduction can be secured.

Furthermore, in order to achieve the above-mentioned object, the method for recording AV data of the present invention includes inputting a transport packet, storing input time information relating to one or a plurality of the input transport packets in a different transport packet, and recording one or a plurality of the transport packets and the different transport packet having the input time information relating to the transport packets, wherein in recording, both one or a plurality of the transport packets and the different transport packet having the input time information are recorded.

According to such a configuration, a real-time recording/reproduction of transport streams including video data can easily be carried out via the 1394 interface because no specific stream converting processes are required. Furthermore, at the time of reproduction, by completely repeating the transferring timing of the packets, consecutive reproduction can be secured. Furthermore, when a personal computer is connected, the recorded file can be seen as a stream that conforms to the MPEG standard.

Furthermore, in order to achieve the above-mentioned object, the AV data reproducing apparatus of the present invention includes reading a packet having a predetermined data structure recorded in a recording medium, extracting one different packet in which a predetermined number of pieces of information relating to one or a plurality of packets including at least information relating to an input time of the packet are recorded as a whole, and specifying the input time of the packet, and outputting the packets, wherein in outputting, the corresponding packet is output based on the information of the packets.

Furthermore, in order to achieve the above-mentioned object, the AV data reproducing method of the present invention includes a reading part for reading a transport packet recorded in a recording medium, a time information extracting part for extracting one different transport packet in which a predetermined number of pieces of input time information relating to one or a plurality of the transport packets recorded in the recording medium are recorded as a whole, and specifying the input time of the transport packet, and an output part for outputting the transport packets, wherein in the output part, the corresponding transport packet is output based on the input time information of the transport packets.

According to such a configuration, when a real-time reproduction of packets including video data, etc. is carried out via the 1394 interface, no specific converting processes are required and thus consecutive reproduction can be secured by completely repeating the original transmission timing of the packets.

Furthermore, in order to achieve the above-mentioned object, the AV data reproducing apparatus of the present invention includes reading a transport packet recorded in a recording medium, extracting one different transport packet in which a predetermined input time information relating to one or a plurality of the recorded transport packets are recorded, and specifying the input time of the transport packet, and outputting the transport packet, wherein in outputting, the corresponding transport packet is output based on the input time information of the transport packet.

According to such a configuration, in the case where a real-time reproduction of transport stream including video data is carried out via the 1394 interface, no specific stream converting processes are required and thus consecutive reproduction can be secured by completely repeating the original transmission timing of the transport packets.

Next, in order to achieve the above-mentioned object, the AV data recording and reproducing apparatus of the present invention includes inputting a packet having a predetermined data structure, storing information relating to one or a plurality of the packets including at least information relating to an input time of the input packet in a different packet having the same data structure, recording one or a plurality of the packets and the different packet having the information relating to the packets, and reading the packet recorded in the recording medium and the different packet, extracting the different packet corresponding to one or a plurality of the packets recorded in the recording medium, and specifying the input time of the packet, outputting the packets, wherein in recording, both one or a plurality of the packets and the different packet having the information relating to the packets are recorded, and in outputting, the corresponding packet is output based on the information of the packets.

Furthermore, in order to achieve the above-mentioned object, the AV data recording and reproducing apparatus of the present invention includes inputting a packet having a predetermined data structure, storing the input time information relating to one or a plurality of the input packets in a different packet having the same data structure, recording one or a plurality of the packets and the different packet having the input time information relating to the packets, reading the packet having a predetermined data structure recorded in the recording medium and the different packet, extracting the different packet corresponding to one or a plurality of the packets recorded in the recording medium, and specifying the input time of the packet, and outputting the packets, wherein in recording, both one or a plurality of the packets and the different packet having the input time information relating to the packets are recorded, and in outputting, the corresponding packet is output based on the input time information of the packets.

According to such a configuration, a real-time recording/reproduction of transports including video data easily can be carried out via the 1394 interface because no specific stream converting processes are required. Furthermore, at the time of reproduction, by completely repeating the transferring timing of the packets, consecutive reproduction can be secured.

Furthermore, in order to achieve the above-mentioned object, the AV data recording and reproducing apparatus of the present invention includes inputting a transport packet, storing input time information relating to one or a plurality of the transport packets in a different transport packet, recording one or a plurality of the transport packets and the different transport packet having the input time information relating to the transport packets, reading the transport packet recorded in a recording medium and the different transport packet, extracting the different transport packet corresponding to one or a plurality of the recorded transport packets, and specifying the input time of the transport packet, and outputting the transport packets, wherein in recording, both one or a plurality of the transport packets and the different transport packet having the input time information are recorded, and in outputting, the corresponding transport packet is output based on the input time information of the transport packets.

According to such a configuration, a real-time recording/reproduction of transport streams including video data easily can be carried out via the 1394 interface because no specific stream converting processes are required. Furthermore, at the time of reproduction, by completely repeating the transferring timing of the packets, consecutive reproduction can be secured. Furthermore, when a personal computer is connected, the recorded file can be seen as a stream that conforms to the MPEG standard.

Furthermore, the same effect can be expected in the recording media such as a disk, a memory card, etc. recorded by the above-mentioned AV data recording apparatus and method or AV data recording and reproducing apparatus and method.

DETAILED DESCRIPTION OF THE PREFERRED EMBODIMENT

First Embodiment

Figure 1:
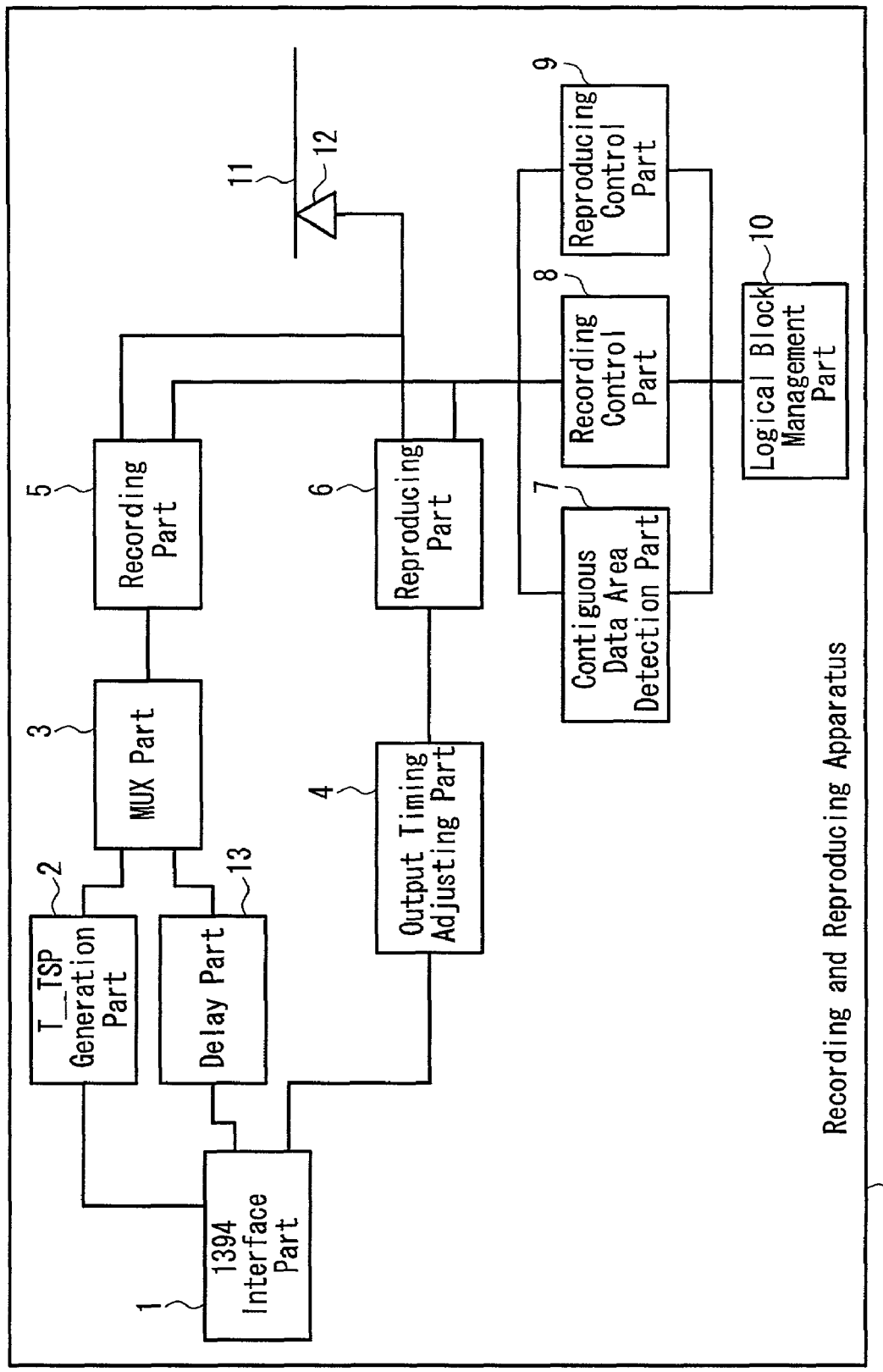
FIG. 1 is a diagram showing a configuration of an AV data recording and reproducing apparatus according to a first embodiment of the present invention.

Hereinafter, a first embodiment of the present invention will be explained with reference to drawings. FIG. 1 is a block diagram showing a configuration of an AV data recording and reproducing apparatus according to the first embodiment of the present invention. At the time of recording, a transport stream including a video signal input from a 1394 I/F (interface) part is written in a phase change optical disk 11 via a delay part 13, a MUX (Multiplex) part 3, a recording part 5 and a pick-up 12. A T_TSP generation part represents the time a transport packet arrives at the 1394 I/F part as time information in 4 bytes and composes 45 pieces of time information into one transport packet (hereinafter, the packet is referred to as "T_TSP"). The MUX part 3 composes the T_TSP so as to be located before the 45 corresponding transport packets. At the time of reproduction, the transport stream read via the pick-up 12 and the reproducing part 6 is output to external equipments via an output timing adjusting part 4.

The output timing adjusting part 4 detects a T_TSP and outputs the T_TSP while adjusting the send-out timing so that the send-out intervals of the 45 following transport packets are equal to the time intervals between the time information recorded in the T_TSP. Furthermore, the T_TSP itself is not output to external equipments.

Furthermore, at the time of recording, the recording control part 8 controls the recording part 5. Furthermore, the recording control part 8 allows the contiguous data area detection part 7 to detect physically continuous empty area. The contiguous data area detection part 7 examines the use state of logic blocks (and sectors) managed by a logic block management part 10 and detects empty areas.

Furthermore, in the recording part 5, recording of the transport packets is started from the position of the logic block number indicated by the recording control part 8. At this time, in the recording part 5, transport packets arriving for one second are divided into 32-Kbyte units and error correction remarks are added to the 32-Kbyte units to be recorded on the phase change optical disk 11 as one logic block.

Furthermore, in a case where the recording of one second of transport packet is finished in the middle of one logic block, transport packets arriving for the next one second are recorded consecutively with out a gap.

On the other hand, until recording is started in the recording part 5 by the contiguous data area detection part 7, 11 seconds or more, calculated by the maximum recording rate, of continuous empty logic block area are detected in advance. Then, the logic block number of the logic block area is notified to the recording part 5 every time the writing of the logic block unit occurs. Furthermore, the fact that the logic block is already used is notified to the logic block management part 10.

The contiguous data area detection part 7 searches the use state of the logic block managed in the logic block management part and detects the area in which unused logic blocks are continued for 11 seconds, calculated by the maximum rate. Herein, the speed of reading data in the reproducing part, the maximum speed of outputting data via the 1394 I/F part and the maximum moving time of the pick-up are assumed to be the same as those in the conventional example.

The logic block management part 10 manages by comprehending the use state for every logic block number by the used logic block number notified by the recording control part 8. That is, the use state of sector units constituting the logic block number is managed by recording whether used or unused by using a space bit descriptor area defined by a UDF or an ISO/IEC 13346 file configuration. Then, at the final stage of the recording process, a FID and a file entry are written in a file management area on the disk.

Figure 2:
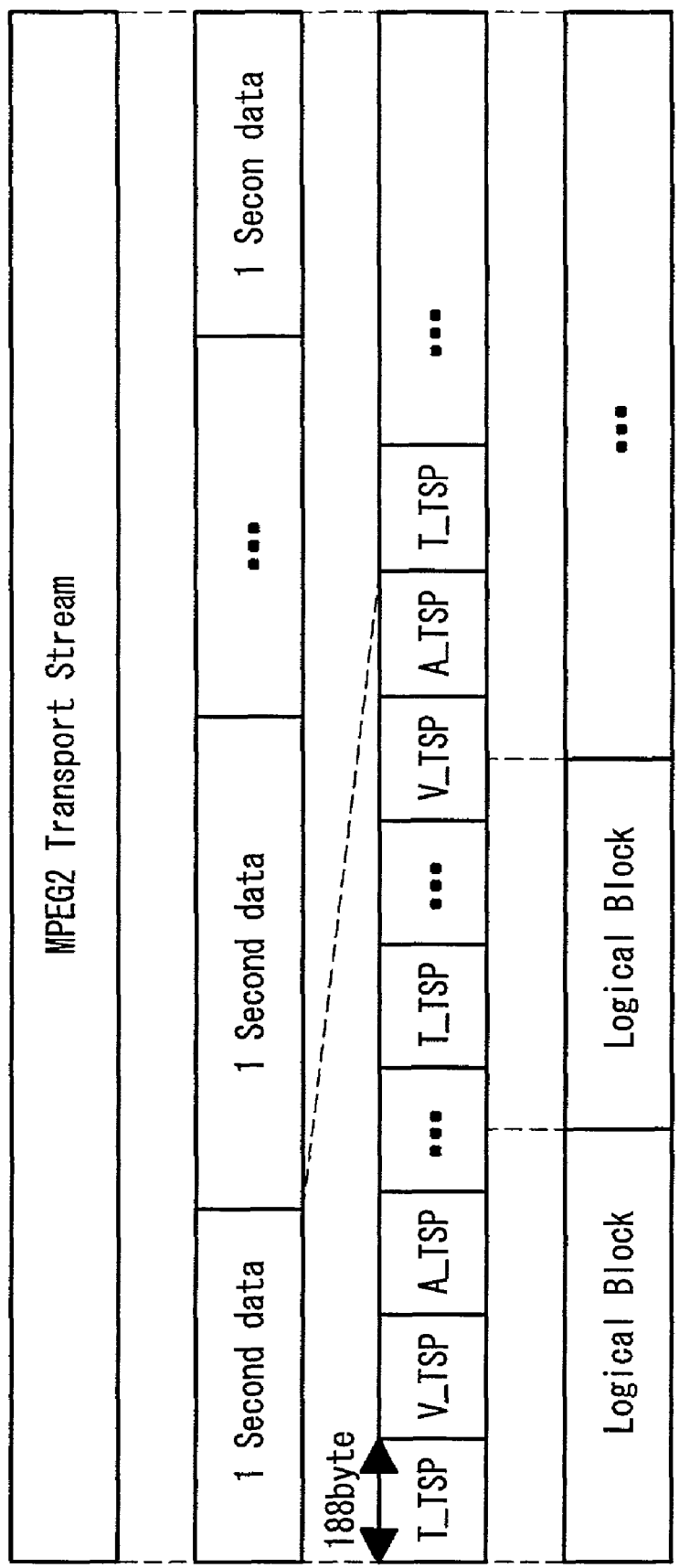
FIG. 2 is a view showing a recording format in the AV data recording and reproducing apparatus according to a first embodiment of the present invention.

Next, FIG. 2 is a view showing a recording format in the AV data recording apparatus according to the first embodiment of the present invention. In FIG. 2, the MPEG transport stream includes a plurality of transport packets continuing without gap. The transport packet includes three kinds of transport packets, that is, a video transport packet (V_TSP) in which video data are stored, an audio transport packet (A_TSP) in which audio data are stored and a time stamp transport packet (T_TSP). Each transport packet has a length of 188 bytes.

Figure 3:
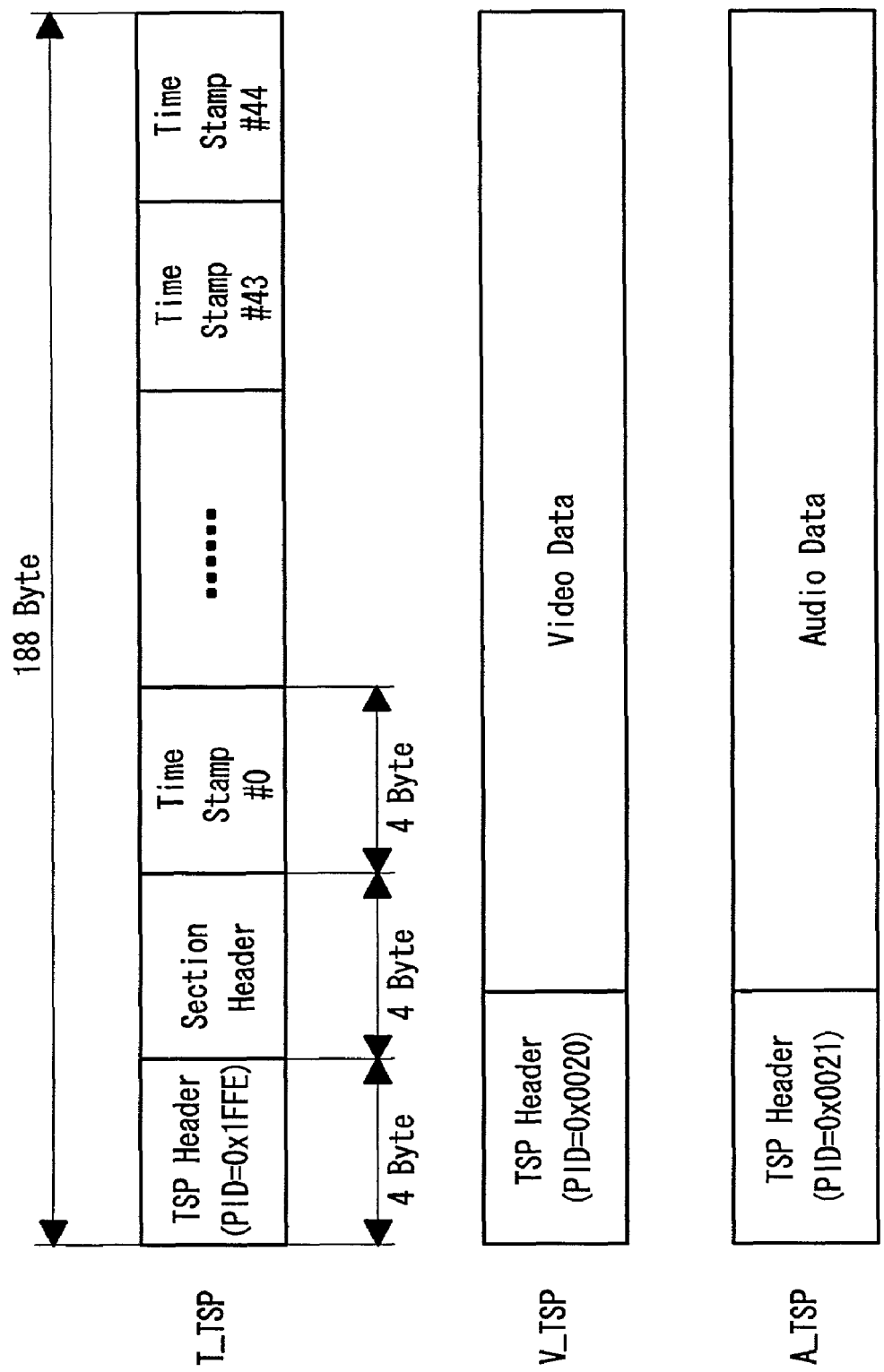
FIG. 3 is a view showing a data structure of a transport packet according to a first embodiment of the present invention.
Figure 4:
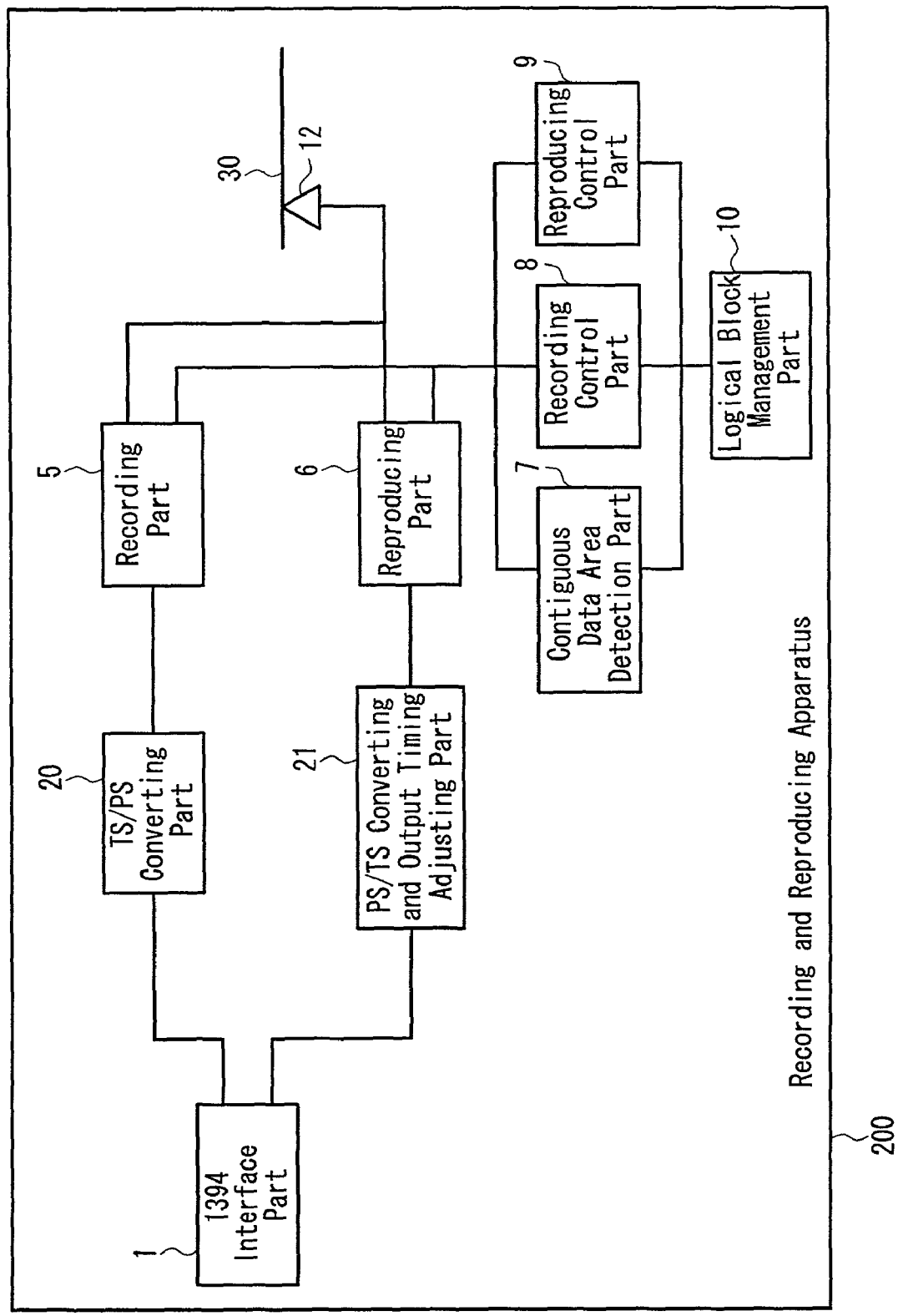
FIG. 4 is a diagram showing a recording content of a conventional AV data recording and reproducing apparatus.

FIG. 3 shows a data structure of each transport packet according to the first embodiment of the present invention. Furthermore, the V_TSP includes a transport packet header and video data, the A_TSP includes a transport packet header and audio data and the T_TSP includes a transport packet header, a section header and 45 time stamps.

Figure 5:
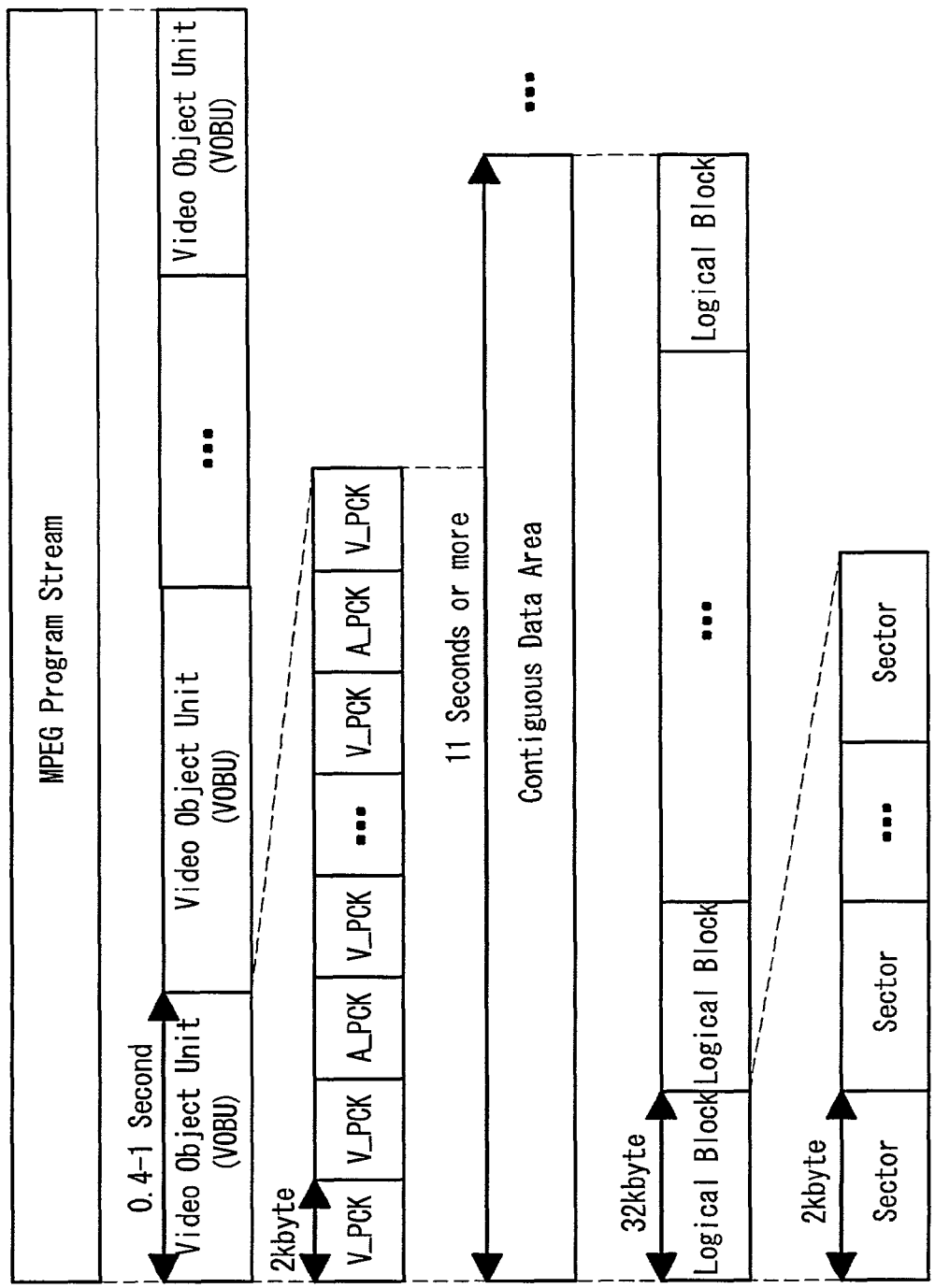
FIG. 5 is a view showing a recording format of a conventional AV data recording and reproducing apparatus.
Figure 6:
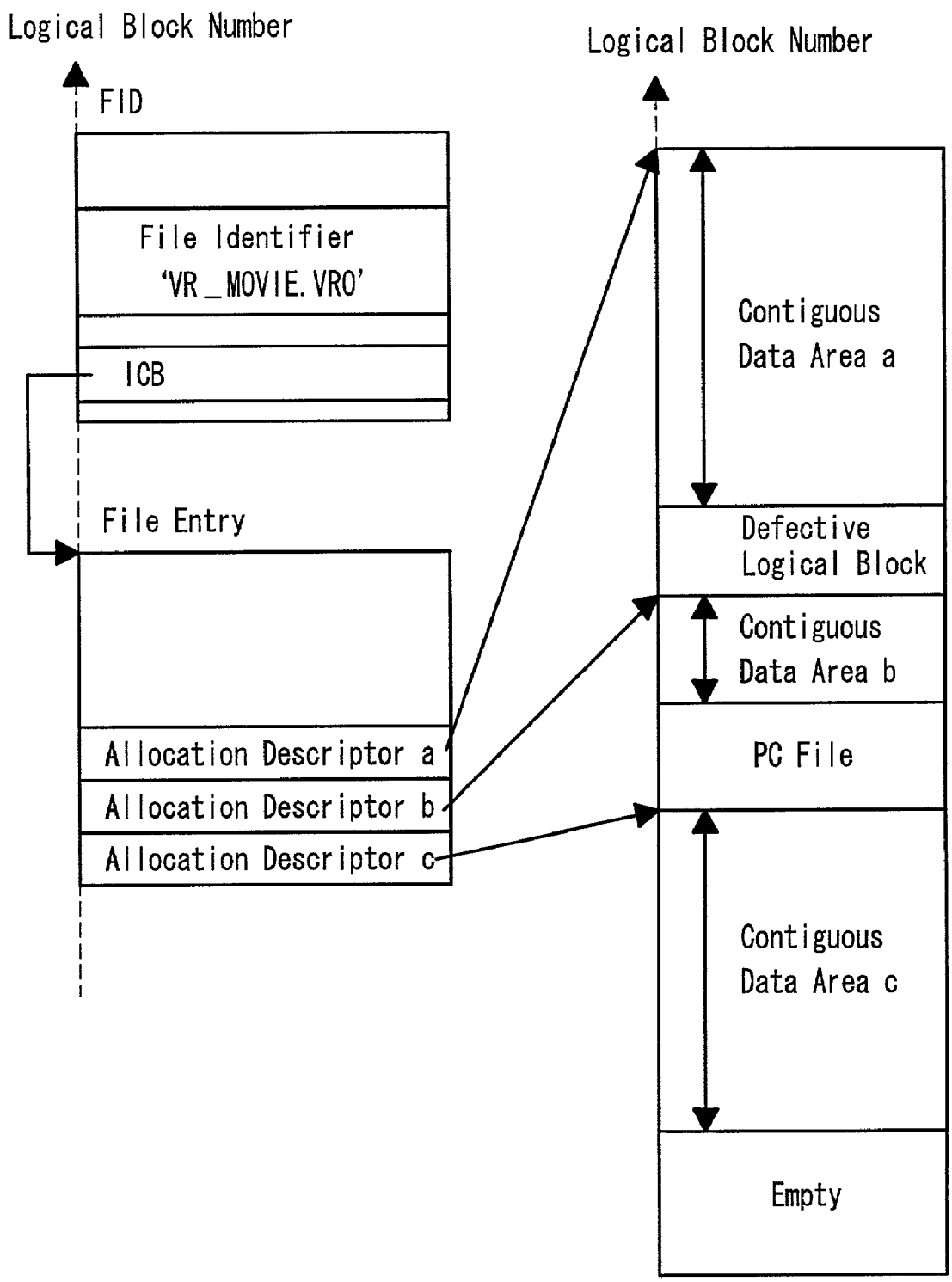
FIG. 6 is a view showing a data structure of a recorded file of a conventional AV data recording apparatus.
Figure 7A:
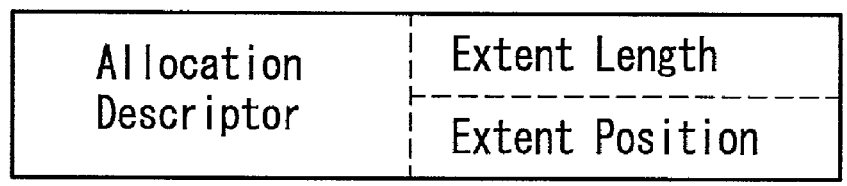
FIG. 7 is a view showing a configuration of an allocation descriptor.
Figure 7B:
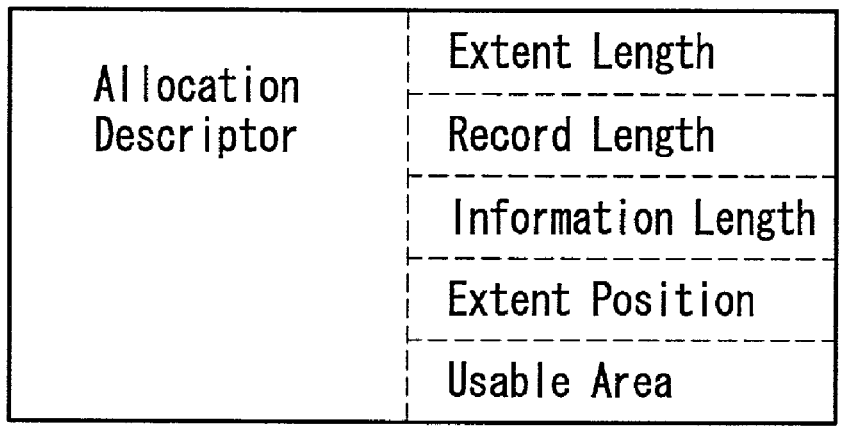

The V_TSP, A_TSP and T_TSP are distinguished from each other by a PID (Packet ID) in the transport packet header. As shown in FIG. 3, the V_TSP is identified by PID="0x0020," the A_TSP is identified by PID="0x0021" and the T_TSP is identified by PID="0x1FFE." The relationship of the transport packet for one second with respect to the contiguous data area, the logic block and the sector is equal to the relationship of the VOBU with respect to the contiguous data area, the logic block and the sector in FIG. 5.

Figure 11:
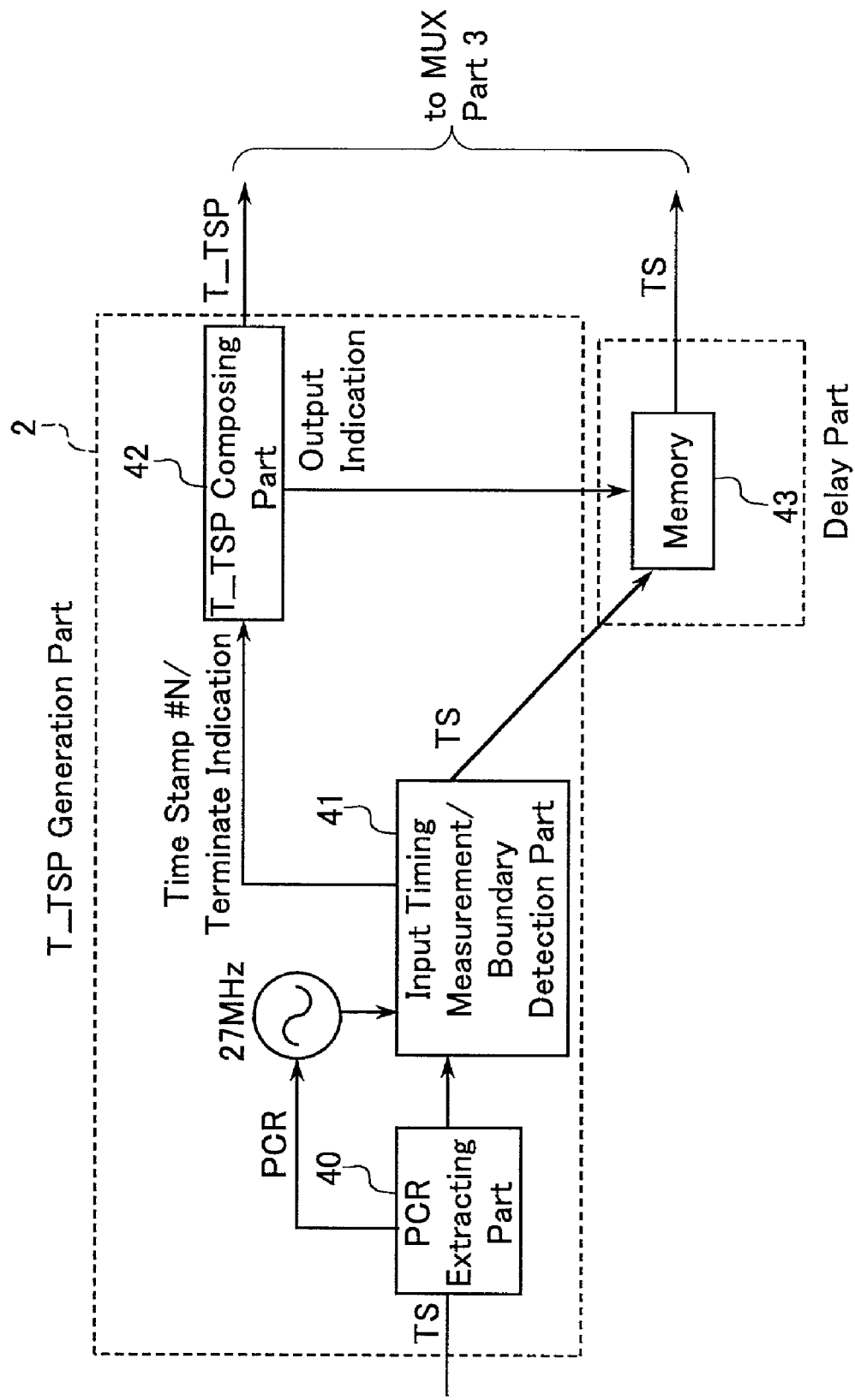
FIG. 11 is a view showing a configuration of a T_TSP generation sector according to a first embodiment of the present invention.

Furthermore, FIG. 11 is a view showing a configuration of the T_TSP generation part 2. In FIG. 11, in a program clock reference (hereinafter referred to as "PCR") extracting part 40, the PCR is extracted from the input transport packets and constitutes a PLL (Phase Lock Loop) circuit to a 27 MHz transmitter.

In an input timing measurement/boundary detection part 41, the input timing of the transport packet is measured in a form of a clock value by using the 27 MHz clock and the lower 4 bytes of the clock value of each transport packet is passed to the T_TSP composing part 42 as a time stamp value.

In the T_TSP composing part 42, when 45 time stamp values are stored, one T_TSP is generated and output, and at the same time, the T_TSP composing part 42 indicates to a memory 43 that the transport packet corresponding to the 45 time stamp values is output just behind the T_TSP.

Furthermore, by detecting the specific boundary of the transport packet in an input timing measurement/boundary detection part 41, when the T_TSP is finished once, the input timing measurement/boundary detection part 41 indicates to the T_TSP composing part 42 to finish before the 45 time stamps are stored.

According to the recording format shown in FIG. 2, the recording content has a bit stream structure conforming to the transport stream defined by the MPEG2 system standard (ISO/IEC 13818-1). Thus, in accessing the recorded file via the SBP-2 protocol from the personal computer that is connected to the AV data recording apparatus via the 1394 interface, since the file conforms to the transport stream, the video display of the file or editing process can easily be processed by using the general-purpose application software. However, herein, when the video data are displayed on a personal computer monitor by using the application software, it is necessary to carry out processes of such as skipping the recorded T_TSP.

This can be realized by omitting to catalog the PID of T_TSP into PMT because the PID that is not cataloged into PMT is neglected in the general reproducing operation.

Furthermore, after recording the arbitrary transport stream input into the 1394 interface in a synchronous transfer (Isochronous) mode, identical transport streams can easily be output in the same timing as at the input time. This is because the input transport stream can be recorded with the time stamp information as it is without converting the input transport stream into the program stream.

Furthermore, since the time stamp information is recorded, at the time of outputting from the 1394 interface, it is not necessary to calculate the sending timing by carrying out a buffer simulation of an external equipment at the receiving side. For example, also in Japan, between CS broadcast and BS broadcast, the assumed buffer size at the receiving side or elementary streams (ES) included or the number of user's unique streams or data rate are different. Even in this case, it is not necessary to carry out a buffer simulation separately for every broadcast system.

Note here that by storing the time stamp information into the transport packet, the affinity with respect to the boundary of the 2-Kbyte sector is more excellent as compared with, for example, a method of adding 2-byte time stamps before the packet for every transport packet, thus making the editing process convenient. This is because the least common multiple of 190 bytes and 2048 bytes is about 190 Kbytes, while the least common multiple of 188 bytes and 2048 bytes is about 94 Kbytes, approximately a half value of the former.

As mentioned above, according to the first embodiment, it is not necessary to carry out specific stream converting processes when using the 1394 interface, the recording is carried out while the consecutive reproductions are secured, and when a personal computer is connected, data can be seen as a data file conforming to the MPEG. Therefore, both securing real-time recording and real-time reproduction by using the synchronous transfer means for video data via the digital interface and securing the reproduction of files by using an asynchronous transfer means can be realized efficiently.

In the first embodiment, the number of the time stamps stored in the V_TSP is 45, however, the number is not particularly limited to this. For example, the number may be 90 in a 2-byte unit or may be less than 60 in a 3-byte unit. However, it is needless to say that as a larger number of time stamps are stored, the redundancy at the time of recording can be reduced.

Furthermore, in the first embodiment, every 45 time stamps, the V_TSP is arranged. However, the input time information with respect to a transport packet including the head of GOP is allowed to be included as the input time information at the head in the T_TSP and arranged just before the transport packet including the GOP. Thus, it is possible to facilitate skipping of reproduction in the GOP unit. Furthermore, the input time information of the transport packet including a sequence header may be included as the input time information at the head in the T_TSP.

Second Embodiment

Figure 8:
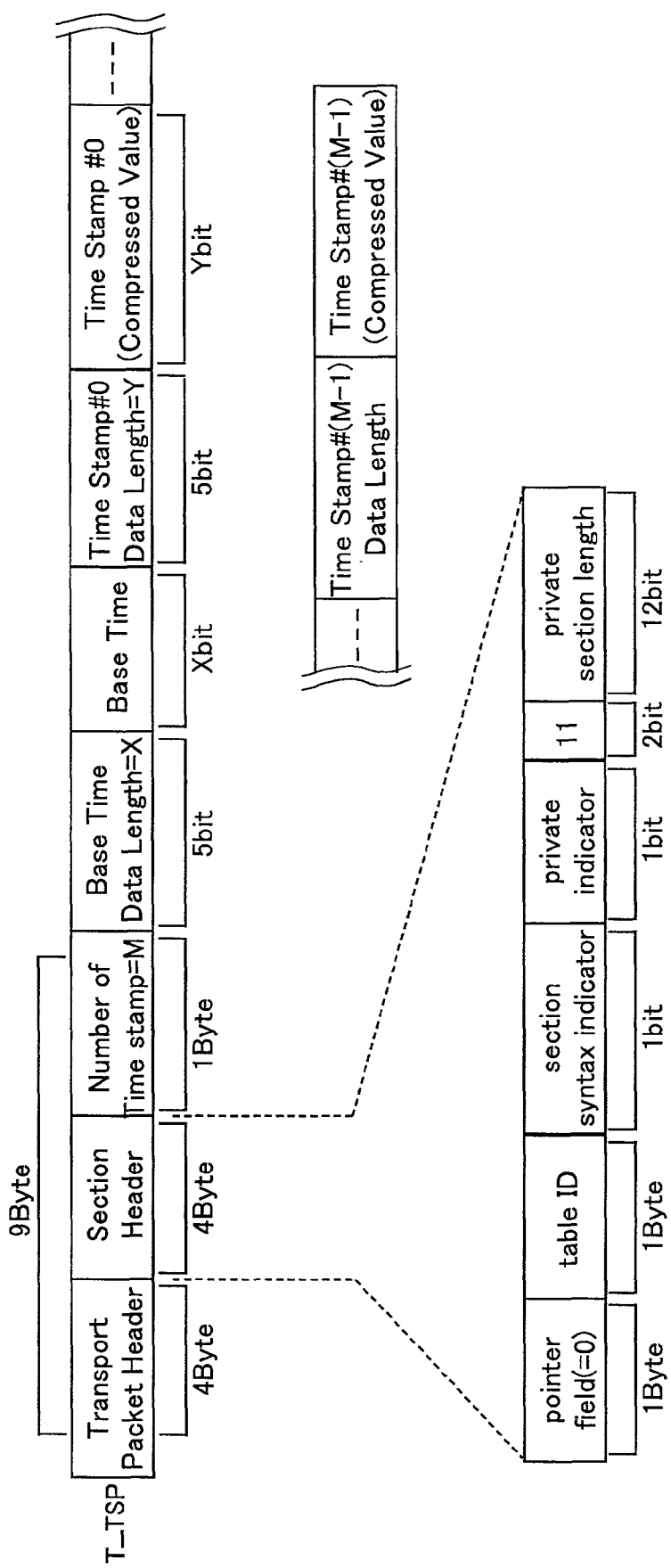
FIG. 8 is a view showing a data structure of a transport packet according to a second embodiment of the present invention.

Hereinafter, a second embodiment of the present invention will be explained with reference to drawings. FIG. 8 is a view showing a data structure of a transport packet T_TSP in an AV data recording and reproducing apparatus according to the second embodiment of the present invention. As shown in FIG. 8, the second embodiment is different from the first embodiment in that the time stamp value is compressed and the compressed value is stored in a form of the variable length data size.

That is, the compressed time stamp value is stored with the data size of the fixed length of 5 bits and then the time stamp value compressed by the representation of a complement on 2 is stored. For example, if the compressed time stamp value is '−1,' it is stored as '11' in the 2-bit notation. Furthermore, if the compressed time stamp value is '1,' it is stored '01' in the 2-bit notation. Furthermore, if the compressed time stamp value is '2,' it is stored as '010' in the 3-bit notation. Thus, the most significant bit is treated as a sign bit.

Then, the combinatorial data including a pair of the above-mentioned data size and the compressed time stamp value are stored repeatedly until the T_TSP is full and the number of the stored combinatorial data also is stored in the T_TSP as the number (M) of time stamps.

Furthermore, the base time value showing the relationship with respect to the compressed time stamp value also is stored in the T_TSP. Herein, the base time value includes the combination of the data size of the base time itself and the base time value. This base time value is a constant that can be set for each T_TSP used for improving the compression rate of the time stamp.

Figure 9:
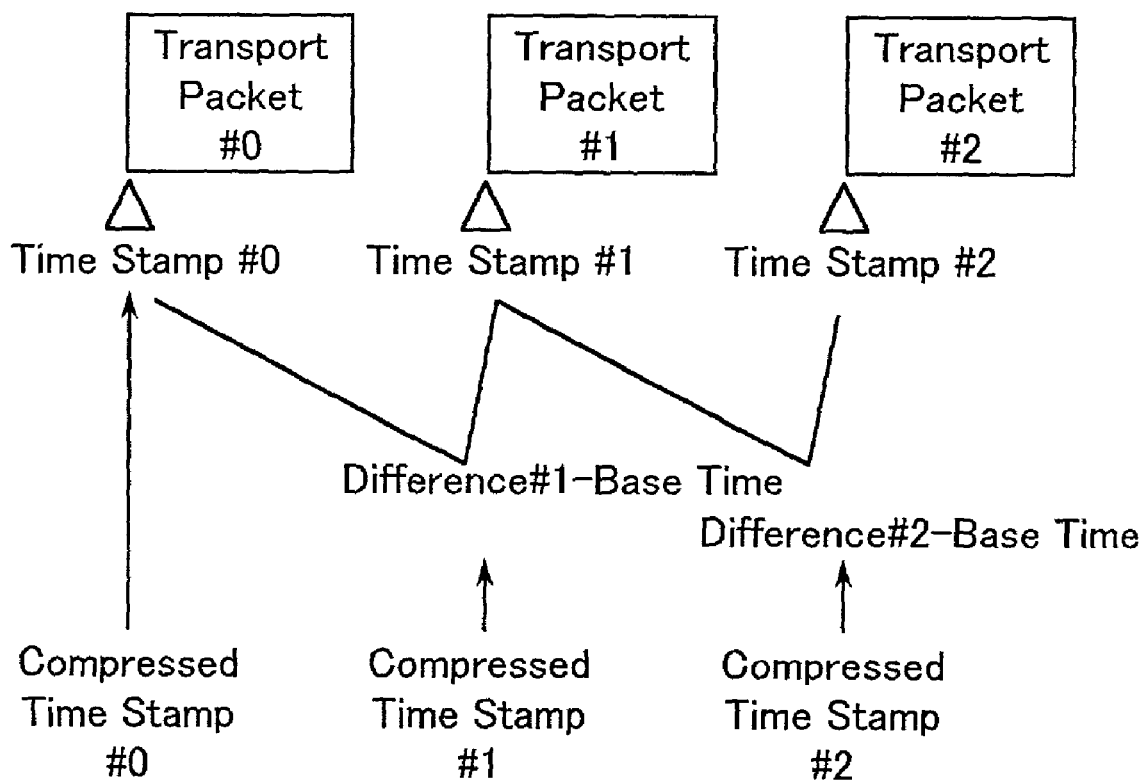
FIG. 9 is a view to illustrate a method for calculating a compressed time stamp value according to a second embodiment of the present invention.

FIG. 9 is a view to illustrate a method for calculating a compressed time stamp value in the AV data recording and reproducing apparatus according to the second embodiment of the present invention. As shown in FIG. 9, in the time stamp value #1 or later in the T_TSP, the difference between the time stamp value and the just preceding time stamp value is calculated and then the base time value is subtracted from the difference. Then, the calculated value is represented in an integer of two's complement and stored in the T_TSP by the use of the minimum necessary number of bits. On the other hand, the time stamp value #0 at the head in the T_TSP is stored as an integer as it is in the T_TSP by the use of the minimum necessary number of bits as an integer.

Figure 10:
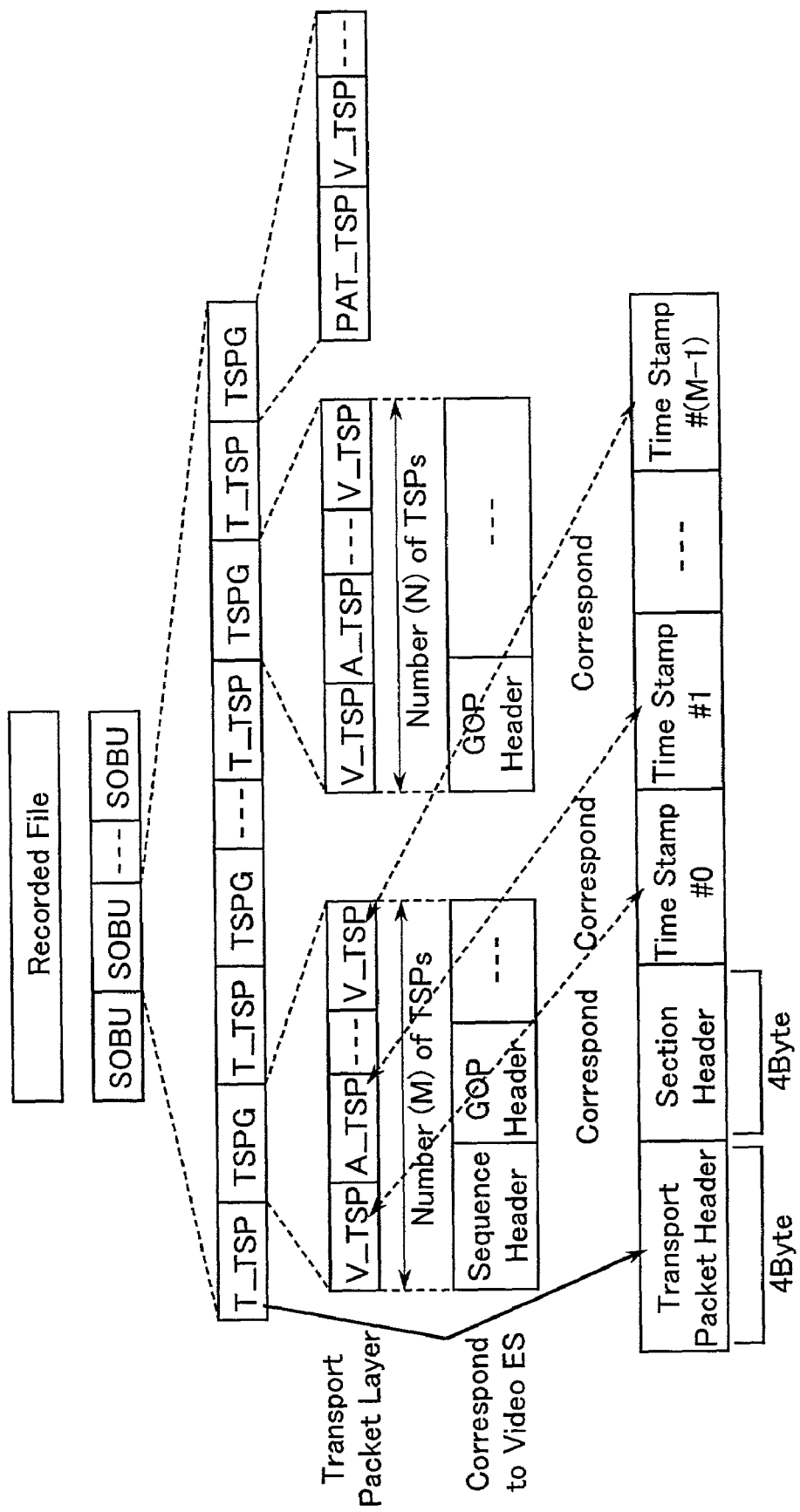
FIG. 10 is a view showing a data structure of a recorded file according to a second embodiment of the present invention.

FIG. 10 is a view showing a data structure of a recorded file in the AV data recording and reproducing apparatus according to the second embodiment of the present invention. As shown in FIG. 10, the recorded file includes a plurality of sequence object units (hereinafter referred to as "SOBU"). Each SOBU includes T_TSP and transport packet groups (hereinafter referred to as "TSPG").

FIG. 10 shows an example in which the first TSPG in a SOBU includes M transport packets and the compressed time stamp with respect to each packet is stored in the just preceding T_TSP. The head of the TSPG is V_TSP and the head of its effective data area (hereinafter referred to as "payload") includes a sequence header defined by the PES header and the ISO/IEC 13818-2 (MPEG-2 video) standard is included.

Furthermore, another TSPG includes N transports packets. The head of one TSPG in a different TSPG is V_TSP and at the head in its payload, a group of picture (hereinafter referred to as "GOP") defined by the ISO/IEC 13818-2 (MPEG2 video) standard is arranged.

Furthermore, although not shown in FIG. 10, similar to the first embodiment, in the case where the compressed time stamp value is not included in one T_TSP, the T_TSP is fulfilled and the rest is stored in the following T_TSP. Since the T_TSP has a variable length, depending upon the number (M) of the time stamps stored in the T_TSP, the data length of each compressed time stamp becomes a different length. Furthermore, even if one T_TSP is not full with time stamp values, it may be possible to stop storing in the T_TSP and to start storing in the following T_TSP.

In FIGS. 8, 9 and 10, the portions not related to the data structure are the same as in the first embodiment.

In the second embodiment, by the data structure shown in FIGS. 8 and 9, 255 time stamps at the maximum can be stored in the T_TSP. The case where the largest number of stamps can be stored is a case where the compressed time stamp value is '0.' In this case, the time stamps of #1 or later requires only 5 bits to show the respective data size. This is the case where the input intervals of the transport packets are equal and the case where the clock value equivalent to the input interval as the base time value. In this case, it is possible to suppress the data amount of the T_TSP to 0.39% of the whole amount. Considering that the data amount is 2.2% in the first embodiment, the data amount of the T_TSP can be compressed to about ⅕ at the maximum.

For example, when the output of the MPEG encoder is connected to the 1394 interface part 1 shown in FIG. 1, by controlling the send-out intervals of the transport packets generated by the MPEG encoder to be as equal intervals as possible, the compression rate of the T_TSP can be enhanced.

Furthermore, as the base time value, by selecting the average value of the difference values between the time stamps when the just preceding T_TSP is generated, it can be expected that the compression rate of the T_TSP is enhanced.

Furthermore, in the case where the average bit rate of the stream to be input is known in advance, as the base time value, by selecting the counter value corresponding to the time interval when the transport packet is input uniformly as a base time value, it can be expected that the compression rate of T_TSP is enhanced.

Furthermore, the base time value is not necessarily set and no problems occur even if the base time value is set to '0 (zero)' at all times. In this case, although the compression rate of the time stamp is deteriorated, as compared with the case of the first embodiment, since the data size of the time stamp value has a variable length, the advantage of the rate (redundancy) of the T_TSP with respect to the whole is not changed.

Furthermore, a transport packet including a sequence header defined by the MPEG2 compressed video data defined by the ISO/EC 13818-2 (MPEG2 video) standard may correspond to the time stamp #0 of T_TSP without fail. However, in order to do so, it is necessary to detect V_TSP including a sequence header at the time of receiving transport packets; to finish the T_TSP once when the V_TSP is detected; and to set the time stamp value of the detected packet to be a time stamp value at the head of a new T_TSP. Thus, regardless of which sequence header in the middle of the video data reproduction is started from, T_TSP is present just in front. Therefore, it becomes unnecessary to search the T_TSP from 255 transport packets at the maximum and to scan time stamps in the T_TSP.

Furthermore, a transport packet including a program association table (hereinafter referred to as "PAT") defined by the ISO/IEC 13818-2 (MPEG2 video) standard may correspond to the time stamp #0 of T_TSP without fail. However, in order to do so, it is necessary to detect PAT at the time of receiving transport packets, to finish the T_TSP once when the PAT is detected, and then to set the time stamp value of the detected packet to be a time stamp value at the head in a new T_TSP. Thus, even if the transport packet is sent out in the middle of the PAT, T_TSP is present just in front. Therefore, it becomes unnecessary to search T_TSP from many (for example, 255) transport packets in order to know the sending timing.

Figure 16:
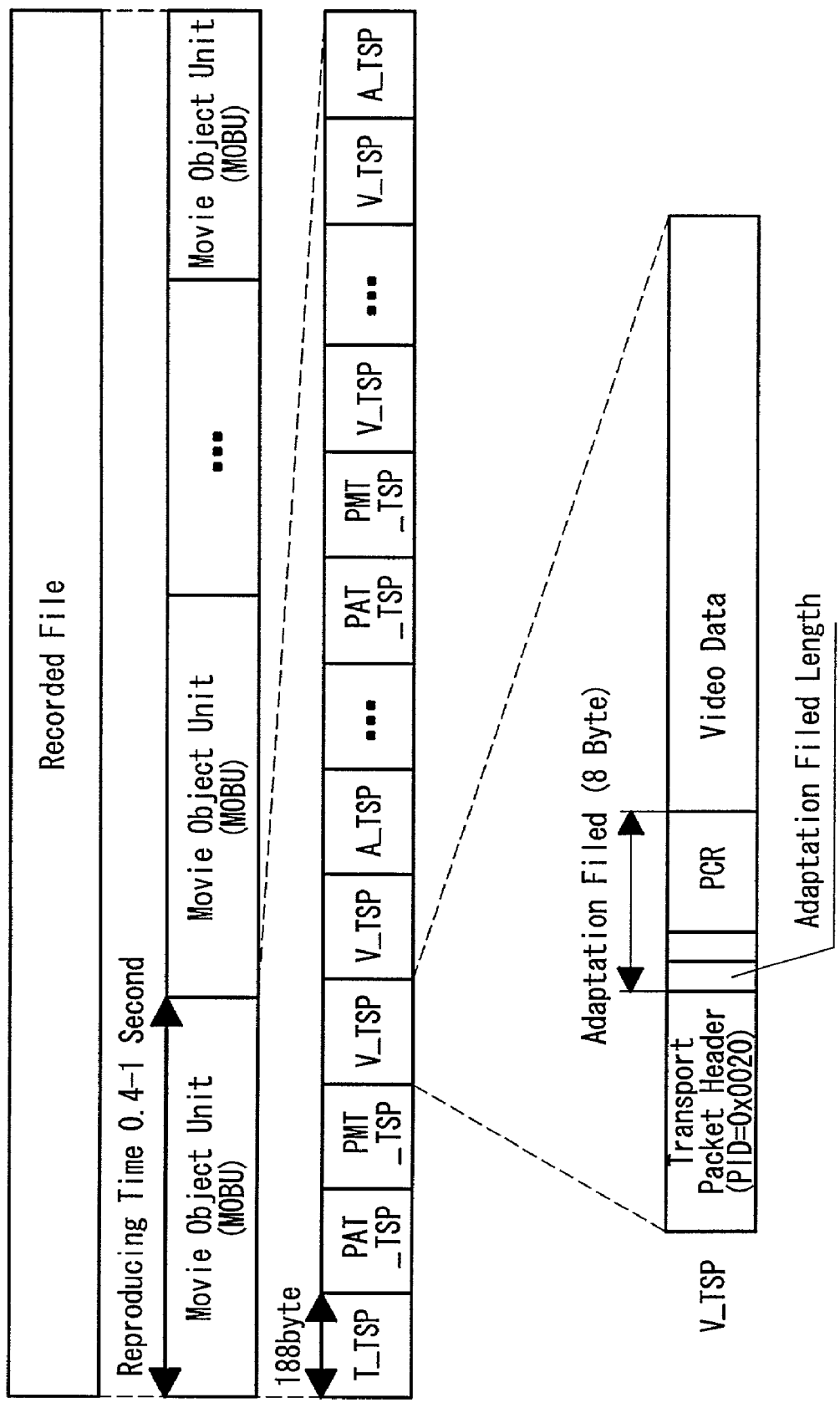
FIG. 16 is a view showing a recording format in an AV data recording and reproducing apparatus according to a second embodiment of the present invention.

Furthermore, in the recording and reproducing apparatus of the present invention, the transport stream is input from the outside. However, in the case where the transport stream is generated inside the recording and reproducing apparatus (for example, in the case where analog video data input is compressed by the MPEG2), as a transport packet constituting TSPG at the head of the SOBU, first, a transport packet including PAT, second, a transport packet including a program map table (hereinafter referred to as "PMT"), and, third, a transport packet including a PES header, a sequence header and PCR (program clock reference) may be arranged. FIG. 16 shows an example of MOBU having the above-mentioned arrangement. Thus, regardless of which sequence header in the middle of the video data the send out is started from, T_TSP is present in the position of three transports before. Therefore, it becomes unnecessary to search the T_TSP from many (for example, 255) transport packets in order to know the send-out timing and to carry out a process of skipping to the time stamp value corresponding to the T_TSP.

Furthermore, a transport packet including a GOP header defined by the ISO/IEC 13818-2 (MPEG2 video) standard may correspond to the time stamp #0 of T_TSP without fail. However, in order to do so, it is necessary to detect a GOP header at the time of receiving the transport packet; to finish the T_TSP once when the GOP header is detected; and to set the time stamp value of the detected packet to be a time stamp value at the head of a new T_TSP. Thus, in the case where the reproduction is started from the GOP header in the middle of the video data, the T_TSP is present just in front. Therefore, it becomes unnecessary to search the T_TSP from the preceding transport packets and to carry out a process of skipping to the corresponding time stamp value in the T_TSP in order to know the send-out timing. In the case where reproduction is started from the head of the GOP, it is necessary that the corresponding PAT, PMT, and sequence header are known and they are output prior to GOP.

Furthermore, when an input transport stream is composed mainly of audio streams and when a transport stream including only audio data is generated by a recording and reproducing apparatus, the time stamp #0 of T_TSP may correspond to a transport packet including the head of the audio frame in every fixed number of audio frames or the preceding PAT/PMT. However, in order to do so, it is necessary to detect an audio frame at the time of receiving transport packets; to finish the T_TSP when time stamps corresponding to the fixed number audio frames are stored in the T_TSP; and to set the following time stamp value to be a time stamp value at the head of the a new T_TSP. Thus, regardless of which audio frame in the middle of the audio stream the reproduction is started from, T_TSP is present just in front. Therefore, it becomes unnecessary to search the T_TSP from the preceding transport packets in order to know the send-out timing. Note here that the fixed number of the audio frames are set to be as an audio frame for, e.g., about 1 second.

Figure 17:
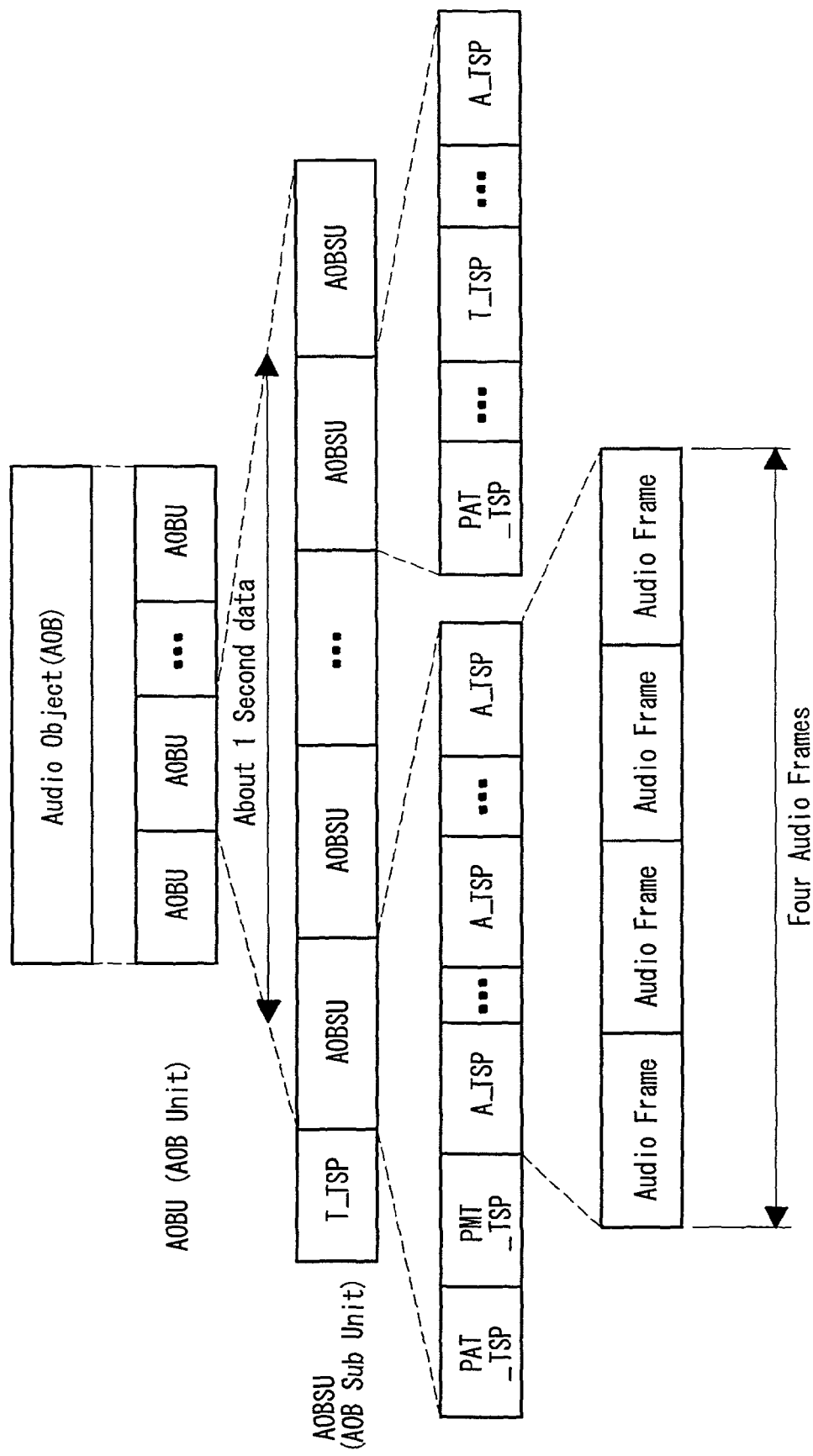
FIG. 17 is a view showing a recording format in an AV data recording and reproducing apparatus according to a second embodiment of the present invention.

FIG. 17 shows an example of the configuration of such a case. In FIG. 17, AOBU includes a fixed number of audio frames corresponding to about one second. At the head of the AOBU, T_TSP is recorded. Furthermore, in each AOBSU, PAT_TSP and PMT_TSP are recorded at the head position, respectively. Furthermore, in each AOBSU, four audio frames are stored. Since the audio frames are recorded in the AOBSU so as to be the fixed number of audio frames of 100 msec or less, the send-out interval of PAT/PMT also becomes 100 msec or less. Note here that T_TSP may be recorded in the middle of the AOBU.

Furthermore, when the input transport stream includes the data stream conforming to a data broadcast defined by Japan's BS digital broadcast standard (ARIB STD-B24), etc., the time stamp #0 of T_TSP may correspond to a transport packet including the head of the decoding unit of the data stream without fail. However, in order to do so, it is necessary to detect the head of the decoding unit of the data stream at the time of receiving the transport packet; to finish the T_TSP once when the head is detected; and to set the time stamp value of the detected packet to be a time stamp value at the head of the a new T_TSP. Thus, regardless of which sequence header in the middle of the video data reproduction is started from, T_TSP is present just in front. Therefore, it becomes unnecessary to search the T_TSP from the preceding transport packets in order to know the send-out timing and further to carry out a process of skipping to the time stamp in the T_TSP.

In the second embodiment, a PES header starts from the head of the payload of the transport packets constituting the TSPG. From the head of the PES header, the sequence header of video data and the GOP header start from the PES header, however, they may start in the middle of the payload.

In the second embodiment, a transport packet constituting the first TSPG of SOBU includes a sequence header, however, a predetermined number (for example, one) of transport packet may is present just in front. For example, by inserting the transport packet having a specific PID at the head of the SOBU without fail, the information relating to each SOBU may be included in the transport packet.

Furthermore, in the second embodiment, in the case where the consecutively compressed time stamp values are equal to each other, the same values are stored consecutively. However, also the amount of information can be compressed by storing the consecutive number itself. For example, when the data length of 5 bits is coded by '11110,' then the consecutive number may correspond to 3 bits of the fixed-length representation. That is, the compressed values of the time stamp just before the data length becomes '11110' are regarded to be consecutive. Thus, it is further possible to suppress the redundancy to about ¼ (⅜₅). However, since in this case the number of the time stamps to be stored in the T_TSP becomes about four times, it is necessary to increase the field for setting the number of time stamps from 8 bits to about 11 bits. Furthermore, also a larger number of bits are assigned to the consecutive number. However, in this case, it is needless to say that consideration is needed so that a delay part 13 does not become excessively large and it also should be kept in mind that the effect when the T_TSP is lost becomes large.

In the second embodiment, the PID of the T_TSP is '0x1FFE,' however, it is preferable that the value of the PID is rarely used in general. It is because the same PIDs are assigned to the different elementary streams if a transport stream input from the outside uses the same PID. Other suitable values include '0x001D', '0x1777', and the like.

In the second embodiment, also the stream input from the outside may use the same PID value as that used for T_TSP. In order to make it easy to distinguish at the time of reproduction, ID (for example, an ASCII character of 'T_TSP') for identifying T_TSP may be inserted into a predetermined position (for example, just behind the section header, that is, the ninth byte from the head). However, if the processing is carried out in accordance with the number of the time stamps inside the T_TSP, the confusion does not occur in principle.

Figure 12:
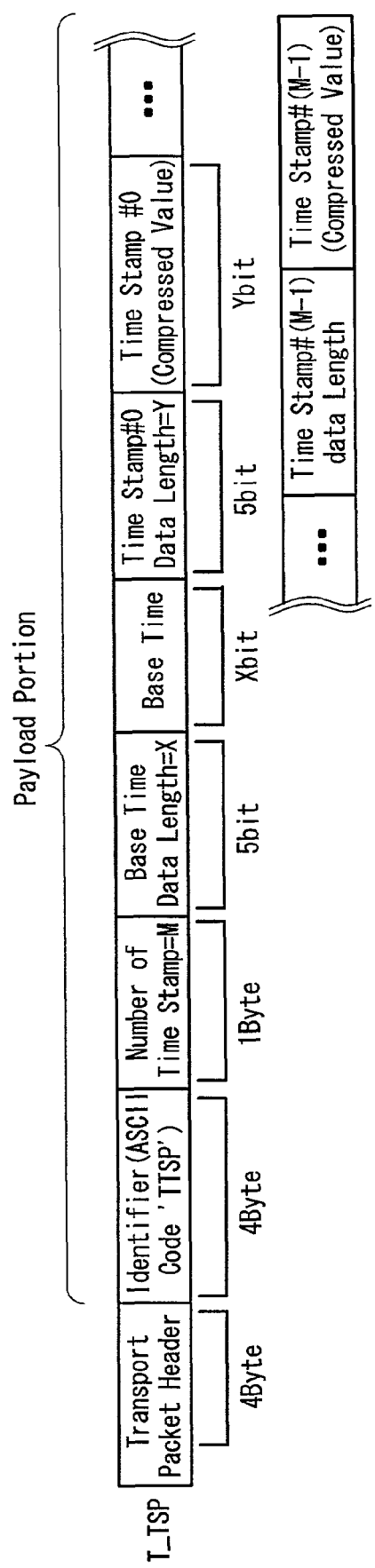
FIG. 12 is a view showing a data structure of a null packet according to a second embodiment of the present invention.

Furthermore, in the second embodiment, the PID of the T_TSP is '0x1FFE' but a null packet in which the PID is determined to be '0x1FFF' in the MPEG standard may be possible. FIG. 12 is a view showing an example of the data structure of the null packet.

In this case, in the MPEG standard, since the payload portion of the null packet may take any values, by storing the time stamps in the payload portion, the time stamps do not collide with the PID of the elementary stream used in the input transport stream. It is because the elementary streams are not stored in the null packet.

It is needless to say that if a MPEG decoder, a display device, or the like is provided inside the AV data recording and reproducing apparatus, the recorded data can be displayed as video data.

Third Embodiment

Hereinafter, a third embodiment of the present invention will be explained with reference to the drawings. In the third embodiment, the case where a motion picture stream that has been recorded in advance by the method shown in the first embodiment or the second embodiment will be explained.

Figure 13:
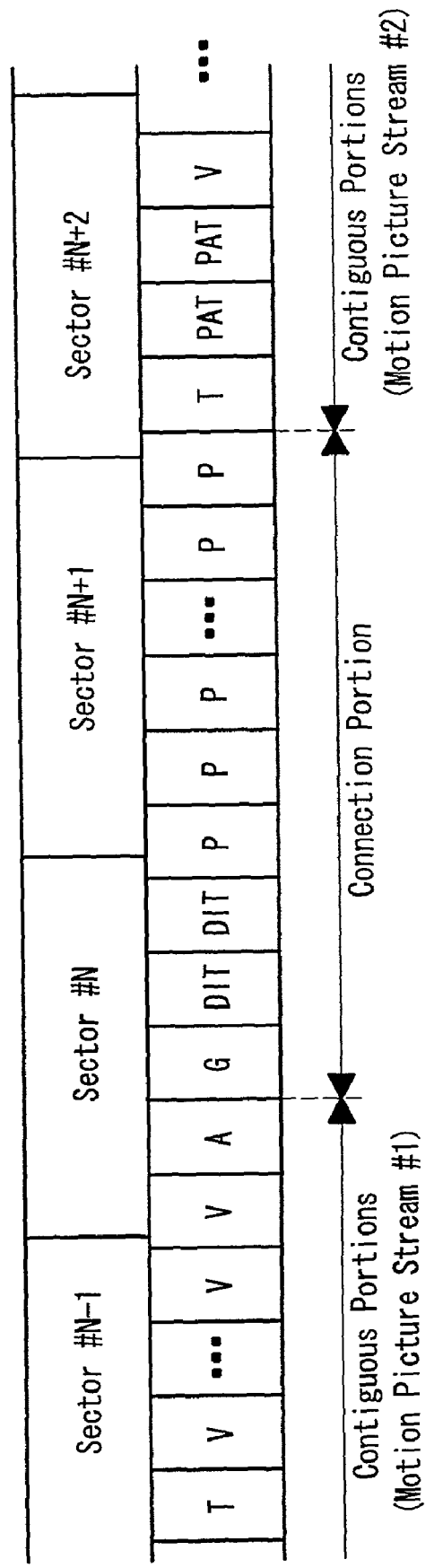
FIG. 13 is a view showing a data structure of a motion picture stream in an AV data recording and reproducing apparatus according to a third embodiment of the present invention.

First, FIG. 13 is a view showing an example of a data structure of recorded motion picture streams in the AV data recording and reproducing apparatus according to the third embodiment of the present invention. In FIG. 13, for simplification of display, V denotes V_TSP, A denotes A_TSP, P denotes P_TSP (padding), T denotes T_TSP (time stamp) and G denotes G_TSP, respectively.

As shown in FIG. 13, the motion picture stream #1 and the motion picture stream #2 are recorded with a connecting portion sandwiched therebetween. The connecting portion starts from the G_TSP (gap transport packet), and then includes two transport packets (the PID of both transport packets is '0x001E') including DITs (Discontinuity Information Table) defined by the DVB standard (actually, DIT is stored in the second one of the two. In the first one, only the value showing the discontinuity is stored). The connecting portion further includes P_TSPs (padding transport packets). Note here that, G_TSP and P_TSP have the unique data structure, respectively. Details thereof are described below.

One G_TSP and two DITs are recorded without fail. The maximum data size of the connecting portion is 94 Kbytes (least common multiple of the sector size 2048 and the packet size 188, that is, 94×1024 bytes) and the minimum data size is 3×188 bytes. Furthermore, the sectors # (N−1), #N, N(N+1) indicate physically continuous sector.

Figure 14:
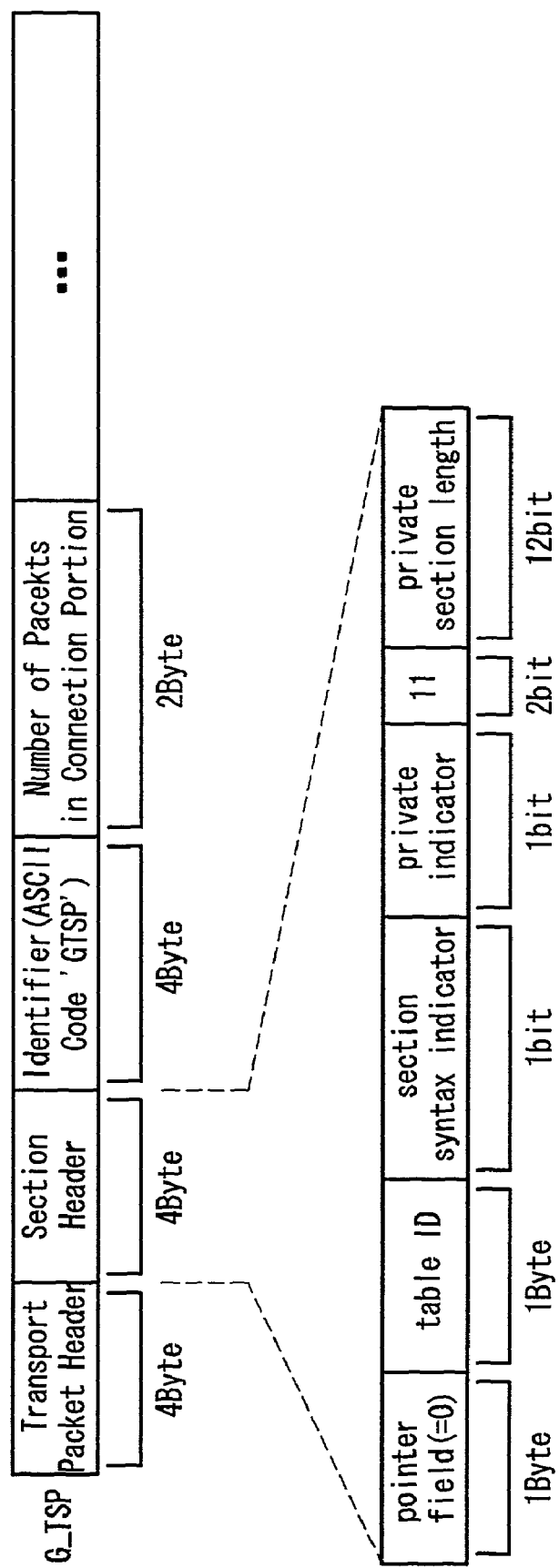
FIG. 14 is a view showing a data structure of a G_TSP according to a third embodiment of the present invention.

FIG. 14 is a view showing an example of the data structure of the G_TSP. The data structure of a transport packet header and a section header are the same as those in FIG. 8 except for a PID (0x1FFE) etc. Following the section header, an identifier ('GTSP') and the number of the transport packets inside the connecting portion are set. In the case where two motion picture streams are connected to each other, since the time stamps are not added into the transport packet in the connecting portion, the number of the transport packets in the connecting portion is equal to the number of the transport packets having no corresponding time stamps.

Figure 15:
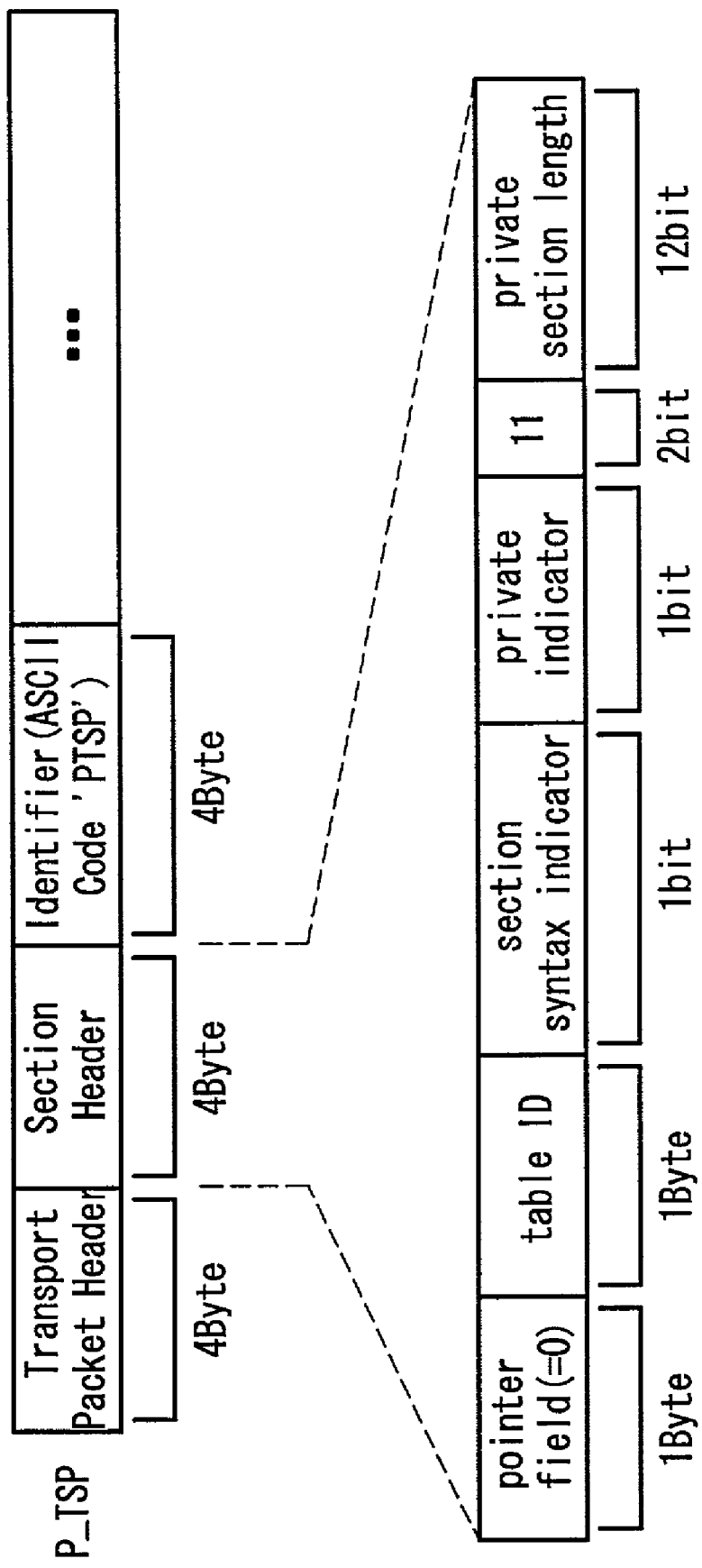
FIG. 15 is a view showing a data structure of a P_TSP according to a third embodiment of the present invention.

FIG. 15 is a view showing an example of the data structure of a P_TSP. Since the P_TSP is a packet used for padding, particularly important values are not stored. It is the same as that of FIG. 14 in that a transport packet header (different in that the PID is '0x1FFC'), a section header, and an identifier ('PTSP') are included.

At the time of connecting motion picture streams, it is necessary to secure the continuity of the transport packets from the motion picture stream #1 through the motion picture stream #2 and to fill the data in each logical sector with transport packets. Therefore, the connecting portion needs the data size of 94 Kbytes at the maximum. That is, it is necessary to newly record data corresponding to the connecting portion at the time of connecting. Furthermore, recording is carried out again so that the connecting portion and the portions before and after thereof are recorded physically consecutively.

At the time of reproducing the connected motion picture streams, by referring to the number of the packets in the connecting portion stored in the G_TSP, among the transport packets corresponding to the number of the packets, packets excluding the transport packets (two) including DIT are not sent out. The two DITs are sent out just behind the preceding motion picture sequentially.

Thus, since unnecessary packets are not sent out when the motion picture streams #1 and #2 are connected, the connection property between the streams is improved. That is, it is possible to prevent a problem in that when the digital television connected to the 1394 interface shown in FIG. 1 decodes motion picture streams, behind the connecting point, there is no data to be displayed next, so that the video frame is not updated and the display freezes for a moment at the just preceding video frame.

Furthermore, since the PID of the G_TSP is made to be the different value from that of the P_TSP, even if there are a plurality of connecting portions, the values of the continuity counter of all G_TSP may be '0 (zero),' and therefore the recording can be carried out easily. If the PID is the same as that of the P_TSP, it is necessary to consider the continuity of the values.

Furthermore, since it is not necessary to the set time stamps at the time of connecting the motion picture streams, the edition processing at the time of the connecting can be simplified. It is because the send-out timing is required to be set at every packet in the case where the time stamps are set.

In the third embodiment, the connecting portion is recorded on the continuous logical sectors. However, even in the case where only the logical sector #(N+1) shown in FIG. 13 is recorded on a logical sector that is extremely physically separated, by observing the number of the transport packets on the connecting portion inside the G_TSP at the time of reproduction, the logical sector #(N+1) can be skipped. Therefore, also the seek operation in the connecting portion can be prevented from occurring.

By assuming such an operation, it is possible to reduce the data size in the contiguous data area in the periphery of the connecting portion, which is needed when two streams are connected. This is because it becomes unnecessary to secure the data size of the portion excluding the connecting portion at both ends as a data size of the contiguous data areas in advance.

In the third embodiment, also in the logical sector #(N+1) in the connecting sector, P_TSP is recorded. However, by observing the number of the transport packets necessary to the connecting portion in the G_TSP, identifying the byte position of the T_TSP in the logical sector #(N+2), and by reading G_TSP, DIT, DIT, T_TSP in this order, data on the logical sector #(N+1) may not be recorded.

Furthermore, in the third embodiment, the number of packets of the connecting portion is recorded in the G_TSP of the connecting portion in the connecting portion, but may be recorded as management data with respect to the transport stream.

Furthermore, in this embodiment, the digital interface is assumed to be a transmission line conforming to the 1394 standard, however, any digital interface may be employed as long as it has synchronous transmission and/or asynchronous transmission of MPEG data.

In this embodiment, the storage medium is assumed to be a phase change optical disk. However, the storage medium is not necessarily limited to this and any recording media having the disk shape can be used. Examples of the recording media include an optical disk such as DVD-RAM, MO, DVD-R, DVD-RW, DVD+RW, CD-R, CD-RW, etc. and a hard disk, and the like. Furthermore, semiconductor memory can be used.

Similarly, in this embodiment, the read/write head is assumed to be a pick up. However, in the case of MO, a pick-up and a magnetic head may be used. Further, in the case of the hard disk, a magnetic head may be used.

In the embodiments of the present invention, the case where input and output are assumed to be carried out via the 1394 interface is assumed. However, recording/reproducing apparatus such as, for example, a cam corder, which has a camera portion, a compression portion and an extension portion in its main body, may be used.

In the embodiment of the present invention, the transport stream may be in a form conforming to the digital broadcast standard using the MPEG, and may be in a form conforming to the digital data broadcast using the MPEG. Thus, it is possible to enhance the compatibility with the set top box (STB) for digital broadcast. Furthermore, this is because it is possible to use a function of STB such as a data broadcast receiving function.

In this embodiment, the T_TSP is arranged just before the corresponding transport packet, the T_TSP may be arranged just behind the corresponding transport packet. Furthermore, the T_TSP may be in the position separating from the corresponding transport packet. However, in this case, it is needless to say that the position information of the corresponding transport packet is required to be added.

In this embodiment, the data structure of the section in which the time stamp defined by the ISO/IEC 13818-1 (MPEG2 system) standard is used. However, a data structure of the PES stream defined by the same standard, a data structure in the user data in the PES header, or a data structure of the user data in the adaptation field may be used.

In this embodiment, all of the input transport packets are assumed to be recorded, however, by detecting PID etc., the T_TSP may be removed at the time of imputing. Thus, it is possible to prevent the T_TSP from being added in an overlapped manner by mistake.

Furthermore, in this embodiment, at the time of outputting the recorded file, the T_TSP is not output. However, the T_TSP may be output consciously. Thus, it is possible to realize the copying of the transport stream including the timing information by using the isochronous transmission. That is, even in the case where a function of uniquely providing the time stamp is not included at the receiving side, precise transmission of the timing information becomes possible. For instance, it is effective in the case where the personal computer of the receiving side does not have a special purpose hardware.

In this embodiment, the T_TSP is added after the MPEG stream is composed. However, the T_TSP may be inserted during the composition of the MPEG stream. That is, the MPEG encoder connected to the 1394 interface shown in FIG. 1 may input the MPEG stream into the recording and reproducing apparatus after the T_TSP is inserted in advance. However, in this case, it is needless to say that the process of adding T_TSP needs to be skipped. In this case, the T_TSP is inserted so that a buffer simulation with respect to the T_TSP is satisfied at the time of composing the MPEG stream.

Furthermore, in this embodiment, time stamps are stored in the special purposed transport packet. However, PCR may be set inside all the transport packets. In this case, however, it is needless to say that the data become redundant. Furthermore, all the time stamps may be stored in another file. In this case, it is necessary that the relationship with respect to AV data is determined or managed separately.

As mentioned above, according to the AV data recording and reproducing apparatus of the present invention, it is possible to transmit video data to D-VHS or a set top box (STB) via the digital interface of the IEEE 1394, to facilitate inputting from the D-VHS or set top box (STB) and to easily realize the video recording and reproducing apparatus so that consecutive reproduction and consecutive recording are possible. At the same time, the MPEG system stream recorded when a personal computer is connected can easily be seen simply as data that conforms to the MPEG standard.

That is, it becomes possible to easily realize an AV data recording apparatus having various functions (consecutive reproduction, digital transmission, file operation) with respect to the video data.

What is claimed is:

1. An AV data recording apparatus comprising:
a packet input part configured to input a packet having a predetermined data structure of the entire packet,
an information generation part configured to store predetermined information relating to a plurality of the input packets as a whole in a different packet having the same data structure of the predetermined data structure, and
a recording part configured to record a plurality of the packets and the different packet having the predetermined information relating to the plurality of the packets,
wherein:
the recording part records both a plurality of the packets and the different packet having the predetermined information relating to the plurality of the packets.

2. An AV data recording apparatus comprising:
a packet input part configured to input a packet having a predetermined data structure of the entire packet,
a time information generation part configured to store input time information relating to a plurality of the input packets in a different packet having the same data structure of the predetermined data structure, and
a recording part configured to record a plurality of the packets and the different packet having the input time information relating to the plurality of the packets,
wherein:
the recording part records both a plurality of the packets and the different packet having the input time information relating to the plurality of the packets.

3. An AV data recording apparatus comprising:
a transport packet input part configured to input a transport packet having a predetermined data structure of the entire transport packet,
a time information generation part configured to store input time information relating to a plurality of the input transport packets in a different transport packet having the same data structure of the predetermined data structure, and
a recording part configured to record a plurality of the transport packets and the different transport packet having the input time information relating to the plurality of the transport packets, wherein:

the recording part records both a plurality of the transport packets and the different transport packet having the input time information.

4. The AV data recording apparatus according to claim 3, wherein in the time information generation part, a predetermined number of pieces of the input time information are stored as a whole in the other transport packet, and in the recording part, just behind the different transport packet having the input time information relating to a predetermined number of the transport packets, a plurality of the corresponding transport packets are recorded.

5. The AV data recording apparatus according to claim 3, wherein in the time information generation part, a predetermined number of pieces of the input time information are stored as a whole in the other transport packet, and in the recording part, just before the different transport packet having the input time information relating to a predetermined number of the transport packets, a plurality of the corresponding transport packets are recorded.

6. The AV data recording apparatus according to claim 3, wherein in the recording part, just behind the different transport packet having the input time information relating to the individual transport packets, the corresponding transport packet is recorded.

7. The AV data recording apparatus according to claim 3, wherein in the recording part, just before the different transport packet having the input time information relating to the individual transport packets, the corresponding transport packet is recorded.

8. The AV data recording apparatus according to claim 3, wherein in the time information generation part, the input time information with respect to a transport packet including the head portion of a decoding unit of video data is stored as the input time information located substantially at the head position in the different transport packet.

9. The AV data recording apparatus according to claim 3, wherein in the time information generation part, the input time information with respect to a transport packet including the head portion of a sequence header of video data is stored as the input time information located substantially at the head position in the different transport packet.

10. The AV data recording apparatus according to claim 9, wherein in the time information generation part, the input time information with respect to a transport packet further including a program association table is stored as the input time information located substantially at the head position in the different transport packet.

11. The AV data recording apparatus according to claim 9, wherein in the time information generation part, the input time information with respect to a transport packet further including a GOP header of video data is stored as the input time information located substantially at the head position in the different transport packet.

12. The AV data recording apparatus according to claim 3, wherein in the time information generation part, the input time information with respect to a transport packet including the head portion of a decoding unit of audio data is stored as the input time information located substantially at the head position in the different transport packet.

13. The AV data recording apparatus according to claim 3, wherein in the time information generation part, the input time information with respect to a transport packet including the head portion of a decoding unit of a data broadcast stream is stored as the input time information located substantially at the head position in the different transport packet.

14. The AV data recording apparatus according to claim 3, wherein in the transport packet input part, the different transport packet having the input time information is removed.

15. The AV data recording apparatus according to claim 3, wherein in the time information generation part, the input time information is stored in a payload area of a null packet.

16. The AV data recording apparatus according to claim 3, wherein in the time information generation part, the number of transport packets in which the input time information is not stored is stored in the different transport packet.

17. An AV data recording apparatus comprising:
a transport packet generation part having a predetermined data structure of the entire transport packet,
a time information generation part configured to store input time information relating to a plurality of the transport packets input from the transport packet generation part in a different transport packet having the same data structure of the predetermined data structure, and
a recording part configured to record a plurality of the transport packets and the different transport packet having the input time information relating to the plurality of the transport packets, wherein:
the recording part records both a plurality of the transport packets and the different transport packet having the input time information;
the time information generation part stores a value obtained by subtracting a predetermined value from the difference value between the two input times of the plurality of the transport packets as the input time information; and
the transport packet generation part generates the plurality of the transport packets substantially at the same intervals.

18. An AV data reproducing apparatus comprising:
a reading part configured to read a packet having a predetermined data structure of the entire packet recorded in a recording medium,
a information extracting part configured to extract one different packet recorded in the recording medium, the one different packet has the same data structure of the predetermined data structure and stores a predetermined number of pieces of predetermined information relating to a plurality of packets recorded in the recording medium that are recorded as a whole, and specifying the predetermined information of the plurality of the packets, and
an output part configured to output the plurality of the packets,
wherein in the output part, the corresponding packet is output based on the predetermined information relating to the plurality of the packets.

19. An AV data reproducing apparatus comprising:
a reading part configured to read a packet having a predetermined data structure of the entire packet recorded in a recording medium,
a time information extracting part configured to extract one different packet recorded in the recording medium, the one different packet has the same data structure of the predetermined data structure and stores a predetermined number of pieces of input time information relating to a plurality of the packets recorded in the recording medium that are recorded as a whole, and specifying the input time of the plurality of the packets, and
an output part configured to output the plurality of the packets, wherein in the output part, the corresponding packet is output based on the input time information relating to the plurality of the packets.

20. An AV data reproducing apparatus comprising:
a reading part configured to read a transport packet having a predetermined data structure of the entire transport packet recorded in a recording medium,
a time information extracting part for extracting one different transport packet recorded in the recording medium, the one different packet has the same data structure of the predetermined data structure and stores a predetermined number of pieces of input time information relating to a plurality of the transport packets recorded in the recording medium that are recorded as a whole, and specifying the input time of the transport packet, and
an output part configured to output the plurality of the transport packets,
wherein in the output part, the corresponding transport packet is output based on the input time information of the plurality of the transport packets.

21. The AV data reproducing apparatus according to claim 20, wherein in the output part, the transport packet located behind the different transport packet including the input time information is output based on the input time information.

22. The AV data reproducing apparatus according to claim 20, wherein in the output part, the transport packet located before the different transport packet including the input time information is output based on the input time information.

23. The AV data reproducing apparatus according to claim 20, wherein in the output part, the different transport packet in which the input time information is recorded is output together.

24. The AV data reproducing apparatus according to claim 20, wherein in the time information extracting part, when the input time information is equal consecutively, the number the input time information which is equal consecutively is stored as the input time information is extracted.

25. The AV data reproducing apparatus according to claim 20, wherein in the time information extracting part, the input time information with respect to a transport packet including the head portion of a decoding unit of a specific elementary stream stored as the input time information located substantially at the head position in the different transport packet is extracted.

26. The AV data reproducing apparatus according to claim 20, wherein in the time information extracting part, the input time information with respect to a transport packet including the head portion of a decoding unit of video data stored as the input time information located substantially at the head position in the different transport packet is extracted.

27. The AV data reproducing apparatus according to claim 20, wherein in the time information extracting part, the input time information with respect to a transport packet including the head portion of a sequence header of a video data stored as the input time information located substantially at the head position in the different transport packet is extracted.

28. The AV data reproducing apparatus according to claim 27, wherein in the time information extracting part, the input time information with respect to a transport packet including a program association table stored as the input time information located substantially at the head position in the different transport packet also is extracted.

29. The AV data reproducing apparatus according to claim 27, wherein in the time information extracting part, the input time information with respect to a transport packet including a GOP header of video data stored as the input time information located substantially at the head position in the different transport packet also is extracted.

30. The AV data reproducing apparatus according to claim 20, wherein in the time information extracting part, the input time information with respect to a transport packet including the head portion of a decoding unit of audio data stored as the input time information located substantially at the head position in the different transport packet is extracted.

31. The AV data reproducing apparatus according to claim 20, wherein in the time information extracting part, the input time information with respect to a transport packet including the head portion of a decoding unit of a data broadcast stream stored as the input time information located substantially at the head position in the different transport packet is extracted.

32. An AV data reproducing apparatus comprising:
a reading part configured to read a transport packet having a predetermined data structure of the entire transport packet recorded in a recording medium,
a time information extracting part configured to extract one different transport packet recorded in the recording medium, the one different transport packet has the same data structure of the predetermined data structure and stores a predetermined number of pieces of input time information relating to a plurality of the transport packets recorded in the recording medium that are recorded as whole, and
an output part configured to output the plurality of the transport packets,
wherein in the output part, the outputting is carried out while ignoring the different transport packet extracted by the time information extracting part.

33. An AV data reproducing apparatus comprising:
a reading part configured to read a transport packet recorded in a recording medium,
a number extracting part configured to extract one different transport packet recording the number of transport packets recorded in the recording medium, the one different transport packet stores the input time information relating a plurality of the transport packets recorded in the recording medium that are not stored, and specifying the number of the plurality of the transport packets in which the input time information is not stored, and
an output part configured to output the plurality of the transport packets,
wherein in the output part, the plurality of the transport packets in which the input time information is not stored are not output based on the number.

34. An AV data recording and reproducing apparatus comprising:
a packet input part configured to input a packet having a predetermined data structure of the entire packet,
an information generation part configured to store predetermined information relating to a plurality of the packets as a whole in a different packet having the same data structure of the predetermined data structure,
a recording part configured to record a plurality of the packets and the different packet having the predetermined information relating to the packets,
a reading part configured to read the packet stored in a recording medium and the different packet,
an information extracting part configured to extract the different packet corresponding to a plurality of the packets recorded in the recording medium, and specifying the predetermined information of the plurality of the packets, and an output part configured to output the packet,
wherein in the recording part, both a plurality of the packets and the different packet having the predetermined information relating to the packets are recorded, and
in the output part, the corresponding packet is output based on the predetermined information relating to the plurality of the packets.

35. An AV data recording and reproducing apparatus comprising:
a packet input part configured to input a packet having a predetermined data structure of the entire packet,
a time information generation part configured to store input time information relating to a plurality of the input packets in a different packet having the same data structure of the predetermined data structure,
a recording part configured to record a plurality of the packets and the different packet having input time information relating to the plurality of the packets,
a reading part configured to read the plurality of the packets having a predetermined data structure stored in a recording medium and the different packet,
a time information extracting part configured to extract the different packet corresponding to a plurality of the packets recorded in the recording medium, and specifying an input time of the plurality of the packets, and
an output part configured to output the plurality of the packets,
wherein in the recording part, a plurality of the packets and the different packet having input information relating to the plurality of the packets are recorded, and
in the output part, the corresponding packet is output based on the input time information relating to the plurality of the packets.

36. An AV data recording and reproducing apparatus comprising:
a transport packet input part configured to input a transport packet having a predetermined data structure of the entire transport packet,
a time information generation part configured to store input time information relating to a plurality of the input transport packets in a different transport packet having the same data structure of the predetermined data structure,
a recording part configured to record a plurality of the transport packets and the different transport packet having the input time information relating to the plurality of the transport packets,
a reading part configured to read the plurality of the transport packets recorded in a recording medium and the different transport packet,
a time information extracting part configured to extract the different transport packet corresponding to a plurality of the recorded transport packets, and specifying the input time of the transport packet, and
an output part configured to output the plurality of the transport packets,
wherein in the recording part, a plurality of the transport packets and the different transport packet having the input time information are recorded, and,
in the output part, the corresponding transport packet is output based on the input time information of the transport packet.

37. A method for recording AV data, comprising:
inputting, via an AV data recording apparatus, a packet having a predetermined data structure of the entire packet,
storing, via the AV data recording apparatus, predetermined information relating to a plurality of the packets as a whole in a different packet having the same data structure of the predetermined data structure, and
recording, via the AV data recording apparatus, a plurality of the packets and the different packet having the information relating to the plurality of the packets,
wherein:
in recording, both a plurality of the recording packets and the different packet having the predetermined information relating to the plurality of the packets are recorded.

38. A method for recording AV data, comprising:
inputting, via an AV data recording apparatus, a packet having a predetermined data structure of the entire packet,
storing, via the AV data recording apparatus, input time information relating to a plurality of the input packets in a different packet having the same data structure of the predetermined data structure, and
recording, via the AV data recording apparatus, a plurality of the packets and the different packet having the input time information relating to the plurality of the packets,
wherein:
in recording, both a plurality of the packets and the different packet having the input time information relating to the plurality of the packets are recorded.

39. A method for recording AV data, comprising:
inputting, via an AV data recording apparatus, a transport packet having a predetermined data structure of the entire transport packet,
storing, via the AV data recording apparatus, input time information relating to a plurality of the input transport packets in a different transport packet having the same data structure of the predetermined data structure, and
recording, via the AV data recording apparatus, a plurality of the transport packets and the different transport packet having the input time information relating to the transport packets,
wherein:
in recording, both a plurality of the transport packets and the different transport packet having the input time information are recorded.

40. A method for reproducing AV data, comprising:
reading, via an AV data reproducing apparatus, a packet having a predetermined data structure of the entire packet recorded in a recording medium,
extracting, via the AV data reproducing apparatus, one different packet recorded in the recording medium, the one different packet having the same data structure of the predetermined data structure, storing a predetermined number of pieces of predetermined information relating to a plurality of packets that are recorded as a whole, and specifying the predetermined information of the packets, and
outputting, via the AV data reproducing apparatus, the plurality of packets, wherein:
in outputting, the corresponding packet is output based on the predetermined information of the plurality of packets.

41. A method for reproducing AV data, comprising:
reading, via an AV data reproducing apparatus, a packet having a predetermined data structure of the entire packet recorded in a recording medium,
extracting, via the AV data reproducing apparatus, one different packet recorded in the recording medium, the one different packet having the same data structure of the predetermined data structure, storing a predetermined number of pieces of input time information relating to a plurality of the packets recorded in the recording medium that are recorded as a whole, and specifying the input time of the packets, and outputting, via the AV data reproducing apparatus, the plurality of the packets, wherein:

in outputting, the corresponding packet is output based on the input time information of the plurality of the packets.

42. A method for reproducing AV data, comprising:

reading, via an AV data reproducing apparatus, a transport packet having a predetermined data structure of the entire transport packet and recorded in a recording medium, extracting, via the AV data reproducing apparatus, one different transport packet recorded in the recording medium, the one different transport packet having the same data structure of the predetermined data structure, storing a predetermined input time information relating to a plurality of the recorded transport packets that are recorded, and specifying the input time of the transport packet, and outputting, via the AV data reproducing apparatus, the transport packet, wherein:

in outputting, the corresponding transport packet is output based on the input time information of the transport packet.

43. A method for recording and reproducing AV data, comprising:

inputting, via an AV data recording and reproducing apparatus, a packet having a predetermined data structure of the entire packet, storing, via the AV data recording and reproducing apparatus, predetermined information relating to a plurality of the packets as a whole in a different packet having the same data structure of the predetermined data structure, recording, via the AV data recording and reproducing apparatus, a plurality of the packets and the different packet having the predetermined information relating to the plurality of the packets, reading, via the AV data recording and reproducing apparatus, the packet recorded in the recording medium and the different packet, extracting the different packet corresponding to a plurality of the packets recorded in the recording medium, and specifying the predetermined information of the plurality of the packets, and outputting, via the AV data recording and reproducing apparatus, the plurality of the packets, wherein:

in recording, both a plurality of the packets and the different packet having the predetermined information relating to the packets are recorded, and in outputting, the corresponding packet is output based on the predetermined information of the plurality of the packets are output.

44. A method for recording and reproducing AV data, comprising:

inputting, via an AV data recording and reproducing apparatus, a packet having a predetermined data structure of the entire packet, storing, via the AV data recording and reproducing apparatus, the input time information relating to a plurality of the input packets in a different packet having the same data structure of the predetermined data structure, recording, via the AV data recording and reproducing apparatus, a plurality of the packets and the different packet having the input time information relating to the plurality of the packets, reading, via the AV data recording and reproducing apparatus, the packet having a predetermined data structure recorded in the recording medium and the different packet, extracting, via the AV data recording and reproducing apparatus, the different packet corresponding to a plurality of the packets recorded in the recording medium, and specifying the input time of the packet, and outputting, via the AV data recording and reproducing apparatus, the plurality of the packets, wherein:

in recording, both a plurality of the packets and the different packet having the input time information relating to the plurality of the packets are recorded, and in outputting, the corresponding packet is output based on the input time information of the plurality of the packets.

45. A method for recording and reproducing AV data, comprising:

inputting, via an AV data recording and reproducing apparatus, a transport packet having a predetermined data structure of the entire transport packet, storing input time information relating to a plurality of the transport packets in a different transport packet having the same data structure of the predetermined data structure, recording, via the AV data recording and reproducing apparatus, a plurality of the transport packets and the different transport packet having the input time information relating to the plurality of the transport packets, reading, via the AV data recording and reproducing apparatus, the transport packet recorded in a recording medium and the different transport packet, extracting, via the AV data recording and reproducing apparatus, the different transport packet corresponding to a plurality of the recorded transport packets, and specifying the input time of the transport packet, and outputting, via the AV data recording and reproducing apparatus, the plurality of the transport packets, wherein:

in recording, both a plurality of the transport packets and the different transport packet having the input time information are recorded, and in outputting, the corresponding transport packet is output based on the input time information of the plurality of the transport packets.

* * * * *